United States Patent
Liu et al.

(10) Patent No.: US 12,114,217 B2
(45) Date of Patent: Oct. 8, 2024

(54) DATA FORWARDING METHOD AND DEVICE, MASTER BASE STATION AND SLAVE BASE STATION

(71) Applicant: DATANG MOBILE COMMUNICATIONS EQUIPMENT CO., LTD., Beijing (CN)

(72) Inventors: Aijuan Liu, Beijing (CN); Dajun Zhang, Beijing (CN); Jiancheng Sun, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 663 days.

(21) Appl. No.: 17/290,689

(22) PCT Filed: Nov. 1, 2019

(86) PCT No.: PCT/CN2019/114964
§ 371 (c)(1),
(2) Date: Apr. 30, 2021

(87) PCT Pub. No.: WO2020/088634
PCT Pub. Date: May 7, 2020

(65) Prior Publication Data
US 2022/0022114 A1    Jan. 20, 2022

(30) Foreign Application Priority Data
Nov. 2, 2018  (CN) .......................... 201811303669.2

(51) Int. Cl.
*H04W 36/08* (2009.01)
*H04W 36/00* (2009.01)

(52) U.S. Cl.
CPC ....... *H04W 36/08* (2013.01); *H04W 36/0016* (2013.01)

(58) Field of Classification Search
None
See application file for complete search history.

(56) References Cited

U.S. PATENT DOCUMENTS

| 2014/0254554 A1 | 9/2014 | Liu et al. |
| 2015/0223134 A1 | 8/2015 | Hou et al. |
| (Continued) | | |

FOREIGN PATENT DOCUMENTS

| CN | 103124418 A | 5/2013 |
| CN | 103582020 A | 2/2014 |
| (Continued) | | |

OTHER PUBLICATIONS

First Office Action for Japanese Patent Application 2021-523645 issued by the Japanese Patent Office on May 31, 2022, and Its English Translation provided by Global Dossier.

(Continued)

*Primary Examiner* — Saad Khawar
(74) *Attorney, Agent, or Firm* — Ladas & Parry, LLP

(57) ABSTRACT

A data forwarding method and device, a master base station and a slave base station are provided. The data forwarding method includes: after receiving a handover request message sent by a second master base station, if it is determined that a slave base station node is newly added, a service data adaptation protocol (SDAP) layer of a part of flows of a preset protocol data unit (PDU) session is configured at a master base station node, and an SDAP layer of the rest part of flows of the preset PDU is configured at the newly added slave base station node, sending a handover request response message carrying first preset information to a second master base station. The first preset information includes: first identity identifications of all flows configured for the first master base station and data forwarding addresses corresponding to the first identity identifications, and second identity identifications of all flows configured for the newly (Continued)

added first slave base station and data forwarding addresses corresponding to the second identity identifications.

20 Claims, 7 Drawing Sheets

(56) References Cited

U.S. PATENT DOCUMENTS

| | | | |
|---|---|---|---|
| 2016/0073296 | A1 | 3/2016 | Baldwin et al. |
| 2016/0205602 | A1* | 7/2016 | Uchino ................ H04W 36/02 370/331 |
| 2018/0014237 | A1 | 1/2018 | Xu et al. |
| 2018/0035339 | A1 | 2/2018 | Mitsui et al. |
| 2018/0115926 | A1* | 4/2018 | Wu ...................... H04W 36/08 |
| 2018/0270792 | A1 | 9/2018 | Park et al. |
| 2018/0279218 | A1* | 9/2018 | Park ................ H04W 36/0069 |
| 2019/0261234 | A1* | 8/2019 | Park ................ H04W 36/00837 |
| 2020/0022209 | A1 | 1/2020 | Peng et al. |
| 2020/0389809 | A1 | 12/2020 | Jiang |

FOREIGN PATENT DOCUMENTS

| | | |
|---|---|---|
| CN | 104519529 A | 4/2015 |
| CN | 105848222 A | 8/2016 |
| CN | 107018577 A | 8/2017 |
| CN | 108366378 A | 8/2018 |
| CN | 108496318 A | 9/2018 |
| CN | 108633018 A | 10/2018 |
| WO | 2016163544 A1 | 10/2016 |
| WO | 2018128452 A1 | 7/2018 |

OTHER PUBLICATIONS

"Agreements for MR-DC with 5GC," 3GPP TSG-RAN WG2 Meeting #103bis, R2-1816017, Chengdu, China, Sep. 8-12, 2018, Source: Rapporteur (ZTE Corporation), all pages.
"(TP for NR BL CR for TS 37.340) Direct data forwarding in eNB/gNB to Master Node change," 3GPP TSG-RAN WG3#101 Meeting, R3-185294, Gothenburg, Sweden, Aug. 20-24, 2018, Source: Samsung, Agenda item: 10.5.6.4, all pages.
First Office Action for Korean Patent Application 10-2021-7015832 issued by the Korean Patent Office on Jul. 7, 2022, and Its English Translation provided by Global Dossier.
"Support for inter-system MR DC HO (37.340)," 3GPP TSG-RAN WG2 Meeting #104, R2-1817748, Spokane, Washington, USA, Nov. 12-16, 2018, Source: Ericsson; n.a. (draft CR to be merged into rapporteur's CR when agreed), all pages.
"Handover procedure in case of bearer only served by SeNB (1A)," 3GPP TSG-RAN WG3 Meeting #82, R3-132101, San Francisco, USA, Nov. 11-Nov. 15, 2013, Source: NSN, Nokia Corporation; Agenda item: 20.2.1, all pages.
"Data forwarding aspects for DC bearer type change and QoS flow offloading," 3GPP TSG-RAN WG3 NR AH 1807 Meeting, R3-184066; Montreal, Canada, Jul. 2-6, 2018; Source: Ericsson; Agenda Item: 10.5.6.4, all pages.
3rd Generation Partnership Project; Technical Specification Group Radio Access Network; Evolved Universal Terrestrial Radio Access (E-UTRA) and NR; Multi-connectivity; Stage 2 (Release 15), 3GPP TS 37.340, V15.3.0, Sep. 2018, all pages.
"Handling of end markers in 5GS", R3-180946, 3GPP TSG-RAN WG3#99, Athens, Greece, Feb. 26-Mar. 2, 2018, all pages.
"Baseline CR for TS37.340", R3-185418, 3GPP TSG-RAN WG3 #101bis, Chengdu, China, Oct. 8-12, 2018, all pages.
First Office Action and Search Report from CN app. no. 201811303669.2, dated Nov. 4, 2020, with English translation provided by Global Dossier, all pages.
International Search Report from PCT/CN2019/114964, dated Feb. 5, 2020, with English translation provided by WIPO.
Written Opinion of the International Searching Authority International Search Report from PCT/CN2019/114964, dated Feb. 5, 2020, with English translation provided by WIPO.
International Preliminary Report on Patentability International Search Report from PCT/CN2019/114964, dated Apr. 27, 2021, with English translation provided by WIPO.

* cited by examiner after receiving a handover request message sent by a second master base station, if it is determined that a slave base station node is newly added, a service data adaptation protocol (SDAP) layer of a part of flows of a preset protocol data unit (PDU) session is configured at a master base station node, and an SDAP layer of the rest part of flows of the preset PDU is configured at the newly added slave base station node, sending a handover request response message carrying first preset information to a second master base station, where the first preset information includes: first identity identifications of all flows configured for the first master base station and data forwarding addresses corresponding to the first identity identifications, and second identity identifications of all flows configured for the newly added first slave base station and data forwarding addresses corresponding to the second identity identifications; each of the data forwarding addresses corresponding to the first identity identifications is a first tunnel address, and the first tunnel address is configured to forward data to the first master base station; and each of the data forwarding addresses corresponding to the second identity identifications is a second tunnel address, and the second tunnel address is configured to forward data to the first slave base station

/ 31

FIG. 3 receiving a handover request response message carrying first preset information sent by a first master base station, where the first preset information includes: first identity identifications of all flows configured for the first master base station and data forwarding addresses corresponding to the first identity identifications, and second identity identifications of all flows configured for a newly added first slave base station and data forwarding addresses corresponding to the second identity identifications

/ 41 performing a data forwarding, according to the first identity identifications, the data forwarding addresses corresponding to the first identity identifications, the second identity identifications and the data forwarding addresses corresponding to the second identity identifications

/ 42

FIG. 4 receiving a slave base station release request which is sent by a second master base station and carries second preset information, where the second preset information includes: an identity identification of a flow, corresponding to a first identity identification and/or a second identity identification, of which a service data adaptation protocol (SDAP) layer is at the second slave base station, and a data forwarding address corresponding to the identity identification ⟶ 51 performing a data forwarding according to the identity identification and the data forwarding address; the first identity identification is an identity identification of a flow configured for a first master base station, and the second identity identification is an identity identification of a flow configured for a newly added first slave base station; the data forwarding address includes a first tunnel address and/or a second tunnel address, the first tunnel address is configured to forward data to the first master base station, and the second tunnel address is configured to forward data to the first slave base station ⟶ 52

FIG. 5 receiving data directly forwarded by a second master base station and/or a second slave base station ⟶ 61

FIG. 6

DATA FORWARDING METHOD AND DEVICE, MASTER BASE STATION AND SLAVE BASE STATION

CROSS REFERENCE TO RELATED APPLICATIONS

The present application is the U.S. national phase of PCT Application PCT/CN2019/114964 filed on Nov. 1, 2019, which claims a priority of Chinese patent application No. 201811303669.2 filed on Nov. 2, 2018, the disclosures of which are incorporated in their entireties by reference herein.

TECHNICAL FIELD

The present disclosure relates to the field of communications technologies, and in particular, to a data forwarding method and device, a master base station and a slave base station.

BACKGROUND

In an LTE (long term evolution) system, an E-UTRAN (evolved global terrestrial radio access network) is composed of multiple eNodeBs (4G base stations), the eNodeBs are connected to an EPC (4G packet core network) through an S1 interface, the eNodeBs are connected to each other through an X2 interface, and in order to support higher data throughput, a UE (terminal) may implement dual connectivity through two eNodeBs. In the 5G system, similarly to the dual connection of the LTE system, tight coupling interworking (light interworking) of eNodeB and gNB (5G base station) and dual connection of gNB and gNB are also supported. The current specifications support switching from dual connection to dual connection and from single connection to dual connection during handover. However, how to support data forwarding from different flows to an MN (master base station) node and an SN (slave base station) node respectively under one PDU SESSION (protocol data unit SESSION) in the process of switching from dual connectivity or single connectivity to dual connectivity does not exist at present.

In the light interworking scenario for RAN (radio access network) side architecture, eNodeB and gNB, there are two cases, wherein the second scenario also includes NR-NR DC (5G base station dual connectivity).

A) LTE is a master base station, and a 5G node is a scenario of a secondary base station, and is connected to a core network (EPC) through the LTE base station, as shown in FIG. 1 (in the figure, MME refers to a mobility management entity, S1-MME refers to a control plane interface between a 4G base station and EPC, X2 refers to an interface between eNB and gNB when eNB is connected to EPC, and LTE MeNB refers to a 4G master base station).

B) Both the 5G node and the LTE base station are connected to the core network (5GC) of the 5G, as shown in FIG. 2, schematic architectures of eNodeB and gNB light interworking and NR-NR DC (connected to the 5 GC). In the figure, NG refers to an interface between a gNB and an access and mobility management function entity AMF, Xn refers to an interface between an eNB and a gNB when the eNB and the gNB are connected to a 5GC, NR gNB refers to a new air interface 5G base station, and eNB refers to a 4G base station.

In a scenario that an eNB and a gNB are connected to a 5G-C (5G core network), a user plane connection (or referred to as a user plane tunnel) with PDU Session as granularity is established on an NG-U (NG interface user plane), and one UE may establish a user plane connection (or referred to as a user plane tunnel) with PDU Session as granularity on multiple NG-Us at the same time. There are multiple flows under each PDU session, under the condition of single connection, one PDU session corresponds to one tunnel; in a dual connectivity scenario, multiple flows under one PDU session may be configured at the MN and the SN, respectively.

In the related art, in the flow of adding the dual connectivity in the handover process, after receiving the handover request message of the source base station, the target base station determines whether the dual connectivity needs to be established according to the bearer information carried in the handover request message. If a dual connection needs to be established and there is a suitable SCG (Secondary cell group) cell, the target MN initiates an SN addition process to the target SN. After receiving the response of the SN, the target MN sends a handover response message to the source base station.

In the current handover response message, the target MN provides the source MN with a PDU SESSION level data forwarding address. If the target MN decides to configure part of flow service data adaptation protocol (SDAP) layers in a PDU session on the MN side, and another part of flow SDAP layers on the SN side, the corresponding flow data needs to be forwarded to the target MN node and the target SN node, respectively. However, the current specification does not support this scenario.

Specifically, in the handover process, if the target MN determines to configure the SDAP layer of partial flow in one PDU session on the MN, and another partial flow is configured in the SN scenario, the current specification cannot support direct data forwarding to the target SN, which affects performance in the handover process, resulting in poor user experience.

SUMMARY

The disclosure provides a data forwarding method, a data forwarding device, a master base station and a slave base station, which solve the problem that in the related art, a target MN determines to configure a SDAP layer of partial flow in one PDU session on the MN, and the other partial flow is configured in a SN scene, so that direct data forwarding to the target SN cannot be realized.

In order to solve the above technical problem, the present disclosure provides a data forwarding method applied to a first master base station, including:

after receiving a handover request message sent by a second master base station, if it is determined that a slave base station node is newly added, a service data adaptation protocol (SDAP) layer of a part of flows of a preset protocol data unit (PDU) session is configured at a master base station node, and an SDAP layer of the rest part of flows of the preset PDU is configured at the newly added slave base station node, sending a handover request response message carrying first preset information to a second master base station;

where the first preset information includes: first identity identifications of all flows configured for the first master base station and data forwarding addresses corresponding to the first identity identifications, and second identity identifications of all flows configured for the newly added first slave base station and data forwarding addresses corresponding to the second identity identifications;

each of the data forwarding addresses corresponding to the first identity identifications is a first tunnel address, and the first tunnel address is configured to forward data to the first master base station; and each of the data forwarding addresses corresponding to the second identity identifications is a second tunnel address, and the second tunnel address is configured to forward data to the first slave base station.

Optionally, each of the data forwarding addresses is a PDU-session-level data forwarding address for a preset PDU session.

Optionally, subsequent to the sending the handover request response message carrying the first preset information to the second master base station, the method further includes:

receiving data directly forwarded by the second master base station and/or the second slave base station.

A data forwarding method is further provided in the present disclosure, applied to a second master base station and including:

receiving a handover request response message carrying first preset information sent by a first master base station, where the first preset information includes: first identity identifications of all flows configured for the first master base station and data forwarding addresses corresponding to the first identity identifications, and second identity identifications of all flows configured for a newly added first slave base station and data forwarding addresses corresponding to the second identity identifications; and performing a data forwarding, according to the first identity identifications, the data forwarding addresses corresponding to the first identity identifications, the second identity identifications and the data forwarding addresses corresponding to the second identity identifications.

Optionally, the performing the data forwarding according to the first identity identifications, the data forwarding addresses corresponding to the first identity identifications, the second identity identifications and the data forwarding addresses corresponding to the second identity identifications includes:

acquiring the first identity identification which is matched with an identity identification of a flow of which a service data adaptation protocol (SDAP) layer is at the second master base station;

forwarding the flow corresponding to the acquired first identity identification according to the data forwarding address corresponding to the acquired first identity identification; and/or acquiring the second identity identification which is matched with an identity identification of a flow of which a service data adaptation protocol (SDAP) layer is at the second master base station;

forwarding the flow corresponding to the acquired second identity identification according to the data forwarding address corresponding to the acquired second identity identification.

Optionally, the performing the data forwarding according to the first identity identifications, the data forwarding addresses corresponding to the first identity identifications, the second identity identifications and the data forwarding addresses corresponding to the second identity identifications includes:

forwarding data to the first master base station and/or the first slave base station according to the first identity identifications, the data forwarding addresses corresponding to the first identity identifications, the second identity identifications and the data forwarding addresses corresponding to the second identity identifications.

Optionally, prior to the performing the data forwarding according to the first identity identifications, the data forwarding addresses corresponding to the first identity identifications, the second identity identifications and the data forwarding addresses corresponding to the second identity identifications, the method further includes:

sending a slave base station release request carrying second preset information to a second slave base station, according to the first identity identifications, the data forwarding addresses corresponding to the first identity identifications, the second identity identifications and the data forwarding addresses corresponding to the second identity identifications;

where the second preset information includes: the identity identification of the flow, corresponding to the first identity identification and/or the second identity identification, of which the SDAP layer is at the second slave base station, and the data forwarding address corresponding to the identity identification;

each of the data forwarding addresses corresponding to the first identity identifications is a first tunnel address, and the first tunnel address is configured to forward data to the first master base station; and each of the data forwarding addresses corresponding to the second identity identifications is a second tunnel address, and the second tunnel address is configured to forward data to the first slave base station.

Optionally, the sending the slave base station release request carrying the second preset information to the second slave base station according to the first identity identifications, the data forwarding addresses corresponding to the first identity identifications, the second identity identifications and the data forwarding addresses corresponding to the second identity identifications includes:

acquiring the identity identification of the flow, corresponding to the first identity identification and/or the second identity identification, of which the SDAP layer is at the second slave base station, and the data forwarding address corresponding to the identity identification;

sending the slave base station release request carrying the second preset information to the second slave base station, according to the identity identification and the data forwarding address corresponding to the identity identification.

A data forwarding method is further provided in the present disclosure, applied to a second slave base station and including:

receiving a slave base station release request which is sent by a second master base station and carries second preset information, where the second preset information includes: an identity identification of a flow, corresponding to a first identity identification and/or a second identity identification, of which a service data adaptation protocol (SDAP) layer is at the second slave base station, and a data forwarding address corresponding to the identity identification;

performing a data forwarding according to the identity identification and the data forwarding address;

where the first identity identification is an identity identification of a flow configured for a first master base station, and the second identity identification is an identity identification of a flow configured for a newly added first slave base station;

the data forwarding address includes a first tunnel address and/or a second tunnel address, the first tunnel address is configured to forward data to the first master base station, and the second tunnel address is configured to forward data to the first slave base station.

Optionally, the performing the data forwarding according to the identity identification and the data forwarding address includes:

forwarding data to the first master base station and/or the first slave base station according to the identity identification and the data forwarding address.

A data forwarding method is further provided in the present disclosure, applied to a first slave base station and including:

receiving data directly forwarded by a second master base station and/or a second slave base station.

A first master base station is further provided in the present disclosure, including a memory, a processor, a transceiver and a computer program stored in the memory and executable by the processor; where the processor executes the computer program to:

after a handover request message sent by a second master base station is received by the transceiver, if it is determined that a slave base station node is newly added, a service data adaptation protocol (SDAP) layer of a part of flows of a preset protocol data unit (PDU) session is configured at a master base station node, and an SDAP layer of the rest part of flows of the preset PDU is configured at the newly added slave base station node, send, through the transceiver, a handover request response message carrying first preset information to a second master base station;

where the first preset information includes: first identity identifications of all flows configured for the first master base station and data forwarding addresses corresponding to the first identity identifications, and second identity identifications of all flows configured for the newly added first slave base station and data forwarding addresses corresponding to the second identity identifications;

each of the data forwarding addresses corresponding to the first identity identifications is a first tunnel address, and the first tunnel address is configured to forward data to the first master base station; and each of the data forwarding addresses corresponding to the second identity identifications is a second tunnel address, and the second tunnel address is configured to forward data to the first slave base station.

Optionally, each of the data forwarding addresses is a PDU-session-level data forwarding address for a preset PDU session.

Optionally, the processor is further configured to:

receive, through the transceiver, data directly forwarded by the second master base station and/or the second slave base station, after the handover request response message carrying the first preset information is sent to the second master base station.

A second master base station is further provided in the present disclosure, including a memory, a processor, a transceiver and a computer program stored in the memory and executable by the processor, where the processor executes the computer program to:

receive, through the transceiver, a handover request response message carrying first preset information sent by a first master base station, where the first preset information includes: first identity identifications of all flows configured for the first master base station and data forwarding addresses corresponding to the first identity identifications, and second identity identifications of all flows configured for a newly added first slave base station and data forwarding addresses corresponding to the second identity identifications; and perform a data forwarding, through the transceiver, according to the first identity identifications, the data forwarding addresses corresponding to the first identity identifications, the second identity identifications and the data forwarding addresses corresponding to the second identity identifications.

Optionally, the processor is further configured to:

acquire the first identity identification which is matched with an identity identification of a flow of which a service data adaptation protocol (SDAP) layer is at the second master base station;

forward the flow corresponding to the acquired first identity identification according to the data forwarding address corresponding to the acquired first identity identification; and/or acquire the second identity identification which is matched with an identity identification of a flow of which a service data adaptation protocol (SDAP) layer is at the second master base station;

forward the flow corresponding to the acquired second identity identification according to the data forwarding address corresponding to the acquired second identity identification.

Optionally, the processor is further configured to:

forward, through the transceiver, data to the first master base station and/or the first slave base station according to the first identity identifications, the data forwarding addresses corresponding to the first identity identifications, the second identity identifications and the data forwarding addresses corresponding to the second identity identifications.

Optionally, the processor is further configured to: prior to performing the data forwarding according to the first identity identifications, the data forwarding addresses corresponding to the first identity identifications, the second identity identifications and the data forwarding addresses corresponding to the second identity identifications, send, through the transceiver, a slave base station release request carrying second preset information to a second slave base station, according to the first identity identifications, the data forwarding addresses corresponding to the first identity identifications, the second identity identifications and the data forwarding addresses corresponding to the second identity identifications;

where the second preset information includes: the identity identification of the flow, corresponding to the first identity identification and/or the second identity identification, of which an SDAP layer is at the second slave base station, and the data forwarding address corresponding to the identity identification;

each of the data forwarding addresses corresponding to the first identity identifications is a first tunnel address, and the first tunnel address is configured to forward data to the first master base station; and each of the data forwarding addresses corresponding to the second identity identifications is a second tunnel address, and the second tunnel address is configured to forward data to the first slave base station.

Optionally, the processor is further configured to:

acquire the identity identification of the flow, corresponding to the first identity identification and/or the second identity identification, of which the SDAP layer is at the second slave base station, and the data forwarding address corresponding to the identity identification;

send, through the transceiver, the slave base station release request carrying the second preset information to the second slave base station, according to the identity identification and the data forwarding address corresponding to the identity identification.

A second slave base station is further provided in the present disclosure, including a memory, a processor, a transceiver and a computer program stored in the memory and executable by the processor, where the processor executes the computer program to:

receive, through the transceiver, a slave base station release request which is sent by a second master base station and carries second preset information, where the second preset information includes: an identity identification of a flow, corresponding to a first identity identification and/or a second identity identification, of which a service data adaptation protocol (SDAP) layer is at the second slave base station, and a data forwarding address corresponding to the identity identification;

perform a data forwarding, through the transceiver, according to the identity identification and the data forwarding address;

where the first identity identification is an identity identification of a flow configured for a first master base station, and the second identity identification is an identity identification of a flow configured for a newly added first slave base station;

the data forwarding address includes a first tunnel address and/or a second tunnel address, the first tunnel address is configured to forward data to the first master base station, and the second tunnel address is configured to forward data to the first slave base station.

Optionally, the processor is further configured to:

forward, through the transceiver, data to the first master base station and/or the first slave base station according to the identity identification and the data forwarding address.

A first slave base station is further provided in the present disclosure, including a memory, a processor, a transceiver and a computer program stored in the memory and executable by the processor, where the processor executes the computer program to:

receive, by the transceiver, data directly forwarded by a second master base station and/or a second slave base station.

A computer-readable storage medium is further provided in the present disclosure, storing a computer program, where the computer program is executed by a processor to perform the data forwarding method hereinabove.

A data forwarding device is further provided in the present disclosure, applied to a first master base station and including:

a first processing module, configured to, after a handover request message sent by a second master base station is received, if it is determined that a slave base station node is newly added, a service data adaptation protocol (SDAP) layer of a part of flows of a preset protocol data unit (PDU) session is configured at a master base station node, and an SDAP layer of the rest part of flows of the preset PDU is configured at the newly added slave base station node, send a handover request response message carrying first preset information to a second master base station;

where the first preset information includes: first identity identifications of all flows configured for the first master base station and data forwarding addresses corresponding to the first identity identifications, and second identity identifications of all flows configured for the newly added first slave base station and data forwarding addresses corresponding to the second identity identifications;

each of the data forwarding addresses corresponding to the first identity identifications is a first tunnel address, and the first tunnel address is configured to forward data to the first master base station; and each of the data forwarding addresses corresponding to the second identity identifications is a second tunnel address, and the second tunnel address is configured to forward data to the first slave base station.

Optionally, the data forwarding device further includes:

a first receiving module, configured to, after the handover request response message carrying the first preset information is sent to the second master base station, receive data directly forwarded by the second master base station and/or the second slave base station.

A data forwarding device is further provided in the present disclosure, applied to a second master base station and including:

a second receiving module, configured to receive a handover request response message carrying first preset information sent by a first master base station, where the first preset information includes: first identity identifications of all flows configured for the first master base station and data forwarding addresses corresponding to the first identity identifications, and second identity identifications of all flows configured for a newly added first slave base station and data forwarding addresses corresponding to the second identity identifications; and a second processing module, configured to perform a data forwarding, according to the first identity identifications, the data forwarding addresses corresponding to the first identity identifications, the second identity identifications and the data forwarding addresses corresponding to the second identity identifications.

Optionally, the second processing module includes:

a first acquiring sub-module, configured to acquire the first identity identification which is matched with an identity identification of a flow of which a service data adaptation protocol (SDAP) layer is at the second master base station;

a first processing sub-module, configured to forward the flow corresponding to the acquired first identity identification according to the data forwarding address corresponding to the acquired first identity identification; and/or a second acquiring sub-module, configured to acquire the second identity identification which is matched with an identity identification of a flow of which a service data adaptation protocol (SDAP) layer is at the second master base station;

a second processing sub-module, configured to forward the flow corresponding to the acquired second identity identification according to the data forwarding address corresponding to the acquired second identity identification.

Optionally, the second processing module includes:
a third processing sub-module, configured to forward data to the first master base station and/or the first slave base station according to the first identity identifications, the data forwarding addresses corresponding to the first identity identifications, the second identity identifications and the data forwarding addresses corresponding to the second identity identifications.

Optionally, the data forwarding device further includes:
a first sending module, configured to, before the data forwarding is performed according to the first identity identifications, the data forwarding addresses corresponding to the first identity identifications, the second identity identifications and the data forwarding addresses corresponding to the second identity identifications, send a slave base station release request carrying second preset information to a second slave base station, according to the first identity identifications, the data forwarding addresses corresponding to the first identity identifications, the second identity identifications and the data forwarding addresses corresponding to the second identity identifications;

where the second preset information includes: the identity identification of the flow, corresponding to the first identity identification and/or the second identity identification, of which the SDAP layer is at the second slave base station, and the data forwarding address corresponding to the identity identification;

each of the data forwarding addresses corresponding to the first identity identifications is a first tunnel address, and the first tunnel address is configured to forward data to the first master base station; and each of the data forwarding addresses corresponding to the second identity identifications is a second tunnel address, and the second tunnel address is configured to forward data to the first slave base station.

Optionally, the first sending module includes:
a third acquiring sub-module, configured to acquire the identity identification of the flow, corresponding to the first identity identification and/or the second identity identification, of which the SDAP layer is at the second slave base station, and the data forwarding address corresponding to the identity identification;

a first sending sub-module, configured to send the slave base station release request carrying the second preset information to the second slave base station, according to the identity identification and the data forwarding address corresponding to the identity identification.

A data forwarding device is further provided in the present disclosure, applied to a second slave base station and including:
a third receiving module, configured to receive a slave base station release request which is sent by a second master base station and carries second preset information, where the second preset information includes: an identity identification of a flow, corresponding to a first identity identification and/or a second identity identification, of which a service data adaptation protocol (SDAP) layer is at the second slave base station, and a data forwarding address corresponding to the identity identification;

a third processing module, configured to perform a data forwarding according to the identity identification and the data forwarding address;

where the first identity identification is an identity identification of a flow configured for a first master base station, and the second identity identification is an identity identification of a flow configured for a newly added first slave base station;

the data forwarding address includes a first tunnel address and/or a second tunnel address, the first tunnel address is configured to forward data to the first master base station, and the second tunnel address is configured to forward data to the first slave base station.

Optionally, the third processing module includes:
a fourth processing sub-module, configured to forward data to the first master base station and/or the first slave base station according to the identity identification and the data forwarding address.

A data forwarding device is further provided in the present disclosure, applied to a first slave base station and including:
a fourth receiving module, configured to receive data directly forwarded by a second master base station and/or a second slave base station.

The beneficial effect of this disclosed above-mentioned technical scheme is as follows: in the present disclosure, after receiving a handover request message sent by a second master base station, if it is determined that a slave base station node is newly added, a service data adaptation protocol (SDAP) layer of a part of flows of a preset protocol data unit (PDU) session is configured at a master base station node, and an SDAP layer of the rest part of flows of the preset PDU is configured at the newly added slave base station node, a handover request response message carrying first preset information is sent to a second master base station, where the first preset information includes: first identity identifications of all flows configured for the first master base station and data forwarding addresses corresponding to the first identity identifications, and second identity identifications of all flows configured for the newly added first slave base station and data forwarding addresses corresponding to the second identity identifications, each of the data forwarding addresses corresponding to the first identity identifications is a first tunnel address, and the first tunnel address is configured to forward data to the first master base station, and each of the data forwarding addresses corresponding to the second identity identifications is a second tunnel address, and the second tunnel address is configured to forward data to the first slave base station. Therefore, in the handover process, the target base station can provide two tunnel addresses for one PDU session, so that an SN node is added to the target base station, the SDAP layer of partial flow in one PDU session is configured at the MN, and the direct data forwarding to the target SN can be supported under the condition of configuring partial flow at the SN; the problem that in the related art, that the direct data forwarding to the target SN cannot be realized in a case that the target MN determines to configure the SDAP layer of partial flow in one PDU session on the MN and the other partial flow is configured at the SN scene, can be solved.

BRIEF DESCRIPTION OF THE DRAWINGS

FIG. 3 is a first flowchart illustrating a data forwarding method according to some embodiments of the present disclosure;

FIG. 4 is a schematic flow chart diagram of a data forwarding method according to some embodiments of the present disclosure;

FIG. 5 is a schematic flow chart diagram of a data forwarding method according to some embodiments of the present disclosure;

FIG. 6 is a schematic flow chart diagram of a data forwarding method according to some embodiments of the present disclosure;

DETAILED DESCRIPTION

Figure 1:
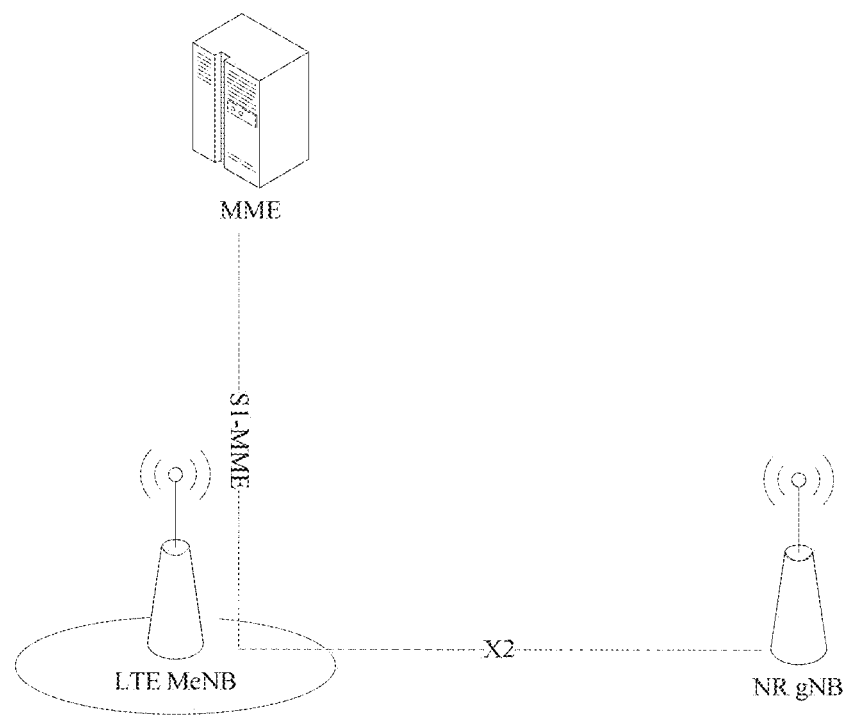
FIG. 1 is a schematic view of an eNodeB and a gNB light interworking architecture in the related art.
Figure 2:
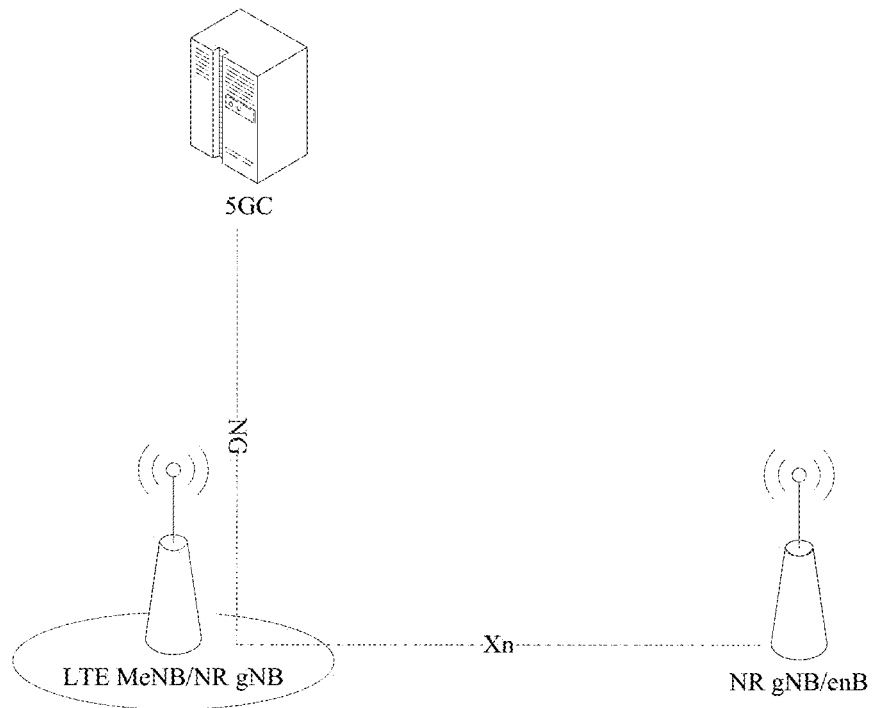
FIG. 2 is a schematic view of an eNodeB, a gNB light interworking and NR-NR DC architecture in the related art.

To make the technical problems, technical solutions and advantages to be solved by the present disclosure clearer, the following detailed description is made with reference to the accompanying drawings and specific embodiments.

The present disclosure provides a data forwarding method, applied to a first master base station (specifically, a target master base station MN in a dual connectivity scenario, but not limited thereto), for a problem that a target MN determines to configure a partial flow SDAP layer in a PDU session on the MN, and another partial flow layer is configured at an SN scenario, so that direct data forwarding to the target SN cannot be implemented, as shown in FIG. 3, the method includes:

Step 31: after receiving a handover request message sent by a second master base station, if it is determined that a slave base station node is newly added, a service data adaptation protocol (SDAP) layer of a part of flows of a preset protocol data unit (PDU) session is configured at a master base station node, and an SDAP layer of the rest part of flows of the preset PDU is configured at the newly added slave base station node, sending a handover request response message carrying first preset information to a second master base station;

where the first preset information includes: first identity identifications of all flows configured for the first master base station and data forwarding addresses corresponding to the first identity identifications, and second identity identifications of all flows configured for the newly added first slave base station and data forwarding addresses corresponding to the second identity identifications;

each of the data forwarding addresses corresponding to the first identity identifications is a first tunnel address, and the first tunnel address is configured to forward data to the first master base station; and each of the data forwarding addresses corresponding to the second identity identifications is a second tunnel address, and the second tunnel address is configured to forward data to the first slave base station.

According to the data forwarding method provided by some embodiments of the present disclosure, after receiving a handover request message sent by a second master base station, if it is determined that a slave base station node is newly added, a service data adaptation protocol (SDAP) layer of a part of flows of a preset protocol data unit (PDU) session is configured at a master base station node, and an SDAP layer of the rest part of flows of the preset PDU is configured at the newly added slave base station node, a handover request response message carrying first preset information is sent to a second master base station, where the first preset information includes: first identity identifications of all flows configured for the first master base station and data forwarding addresses corresponding to the first identity identifications, and second identity identifications of all flows configured for the newly added first slave base station and data forwarding addresses corresponding to the second identity identifications, each of the data forwarding addresses corresponding to the first identity identifications is a first tunnel address, and the first tunnel address is configured to forward data to the first master base station, and each of the data forwarding addresses corresponding to the second identity identifications is a second tunnel address, and the second tunnel address is configured to forward data to the first slave base station. Therefore, in the handover process, the target base station can provide two tunnel addresses for one PDU session, so that an SN node is added to the target base station, the SDAP layer of partial flow in one PDU session is configured at the MN, and the direct data forwarding to the target SN can be supported under the condition of configuring partial flow at the SN; the problem that in the related art, that the direct data forwarding to the target SN cannot be realized in a case that the target MN determines to configure the SDAP layer of partial flow in one PDU session on the MN and the other partial flow is configured at the SN scene, can be solved.

Specifically, each of the data forwarding addresses is a PDU-session-level data forwarding address for a preset PDU session.

Further, subsequent to the sending the handover request response message carrying the first preset information to the second master base station, the method further includes: receiving data directly forwarded by the second master base station and/or the second slave base station.

A data forwarding method is further provided in some embodiments of the present disclosure, which is applied to a second master base station (specifically, the second master base station may be a source base station in a single connection scenario or a source master base station MN in a dual connection scenario, but not limited thereto), as shown in FIG. 4, including:

Step 41: receiving a handover request response message carrying first preset information sent by a first master base station, where the first preset information includes: first identity identifications of all flows configured for the first master base station and data forwarding addresses corresponding to the first identity identifications, and second identity identifications of all flows configured for a newly added first slave base station and data forwarding addresses corresponding to the second identity identifications; and Step 42: performing a data forwarding, according to the first identity identifications, the data forwarding addresses corresponding to the first identity identifications, the second identity identifications and the data forwarding addresses corresponding to the second identity identifications.

According to the data forwarding method provided by some embodiments of the present disclosure, a handover request response message carrying first preset information sent by a first master base station is received, where the first preset information includes: first identity identifications of all flows configured for the first master base station and data forwarding addresses corresponding to the first identity identifications, and second identity identifications of all flows configured for a newly added first slave base station and data forwarding addresses corresponding to the second identity identifications; a data forwarding is performed, according to the first identity identifications, the data forwarding addresses corresponding to the first identity identifications, the second identity identifications and the data forwarding addresses corresponding to the second identity identifications. Therefore, in the handover process, the target base station can provide two tunnel addresses for one PDU session, so that an SN node is added to the target base station, the SDAP layer of partial flow in one PDU session is configured at the MN, and the direct data forwarding to the target SN can be supported under the condition of configuring partial flow at the SN; the problem that in the related art, that the direct data forwarding to the target SN cannot be realized in a case that the target MN determines to configure the SDAP layer of partial flow in one PDU session on the MN and the other partial flow is configured at the SN scene, can be solved.

The performing the data forwarding according to the first identity identifications, the data forwarding addresses corresponding to the first identity identifications, the second identity identifications and the data forwarding addresses corresponding to the second identity identifications includes: acquiring the first identity identification which is matched with an identity identification of a flow of which a service data adaptation protocol (SDAP) layer is at the second master base station; forwarding the flow corresponding to the acquired first identity identification according to the data forwarding address corresponding to the acquired first identity identification; and/or acquiring the second identity identification which is matched with an identity identification of a flow of which a service data adaptation protocol (SDAP) layer is at the second master base station; forwarding the flow corresponding to the acquired second identity identification according to the data forwarding address corresponding to the acquired second identity identification.

Specifically, the performing the data forwarding according to the first identity identifications, the data forwarding addresses corresponding to the first identity identifications, the second identity identifications and the data forwarding addresses corresponding to the second identity identifications includes: forwarding data to the first master base station and/or the first slave base station according to the first identity identifications, the data forwarding addresses corresponding to the first identity identifications, the second identity identifications and the data forwarding addresses corresponding to the second identity identifications.

Further, prior to the performing the data forwarding according to the first identity identifications, the data forwarding addresses corresponding to the first identity identifications, the second identity identifications and the data forwarding addresses corresponding to the second identity identifications, the method further includes: sending a slave base station release request carrying second preset information to a second slave base station, according to the first identity identifications, the data forwarding addresses corresponding to the first identity identifications, the second identity identifications and the data forwarding addresses corresponding to the second identity identifications; where the second preset information includes: the identity identification of the flow, corresponding to the first identity identification and/or the second identity identification, of which the SDAP layer is at the second slave base station, and the data forwarding address corresponding to the identity identification; each of the data forwarding addresses corresponding to the first identity identifications is a first tunnel address, and the first tunnel address is configured to forward data to the first master base station; and each of the data forwarding addresses corresponding to the second identity identifications is a second tunnel address, and the second tunnel address is configured to forward data to the first slave base station.

Specifically, the sending the slave base station release request carrying the second preset information to the second slave base station according to the first identity identifications, the data forwarding addresses corresponding to the first identity identifications, the second identity identifications and the data forwarding addresses corresponding to the second identity identifications includes: acquiring the identity identification of the flow, corresponding to the first identity identification and/or the second identity identification, of which the SDAP layer is at the second slave base station, and the data forwarding address corresponding to the identity identification; sending the slave base station release request carrying the second preset information to the second slave base station, according to the identity identification and the data forwarding address corresponding to the identity identification.

A data forwarding method is further provided in some embodiments of the present disclosure further provide, which is applied to a second slave base station (specifically, but not limited to, a source slave base station SN in a dual connectivity scenario), as shown in FIG. 5, including:

Step 51: receiving a slave base station release request which is sent by a second master base station and carries second preset information, where the second preset information includes: an identity identification of a flow, corresponding to a first identity identification and/or a second identity identification, of which a service data adaptation protocol (SDAP) layer is at the second slave base station, and a data forwarding address corresponding to the identity identification;

Step 52: performing a data forwarding according to the identity identification and the data forwarding address;

the first identity identification is an identity identification of a flow configured for a first master base station, and the second identity identification is an identity identification of a flow configured for a newly added first slave base station;

the data forwarding address includes a first tunnel address and/or a second tunnel address, the first tunnel address is configured to forward data to the first master base station, and the second tunnel address is configured to forward data to the first slave base station.

According to the data forwarding method provided by some embodiments of the present disclosure, a slave base station release request which is sent by a second master base station and carries second preset information is received, where the second preset information includes: an identity identification of a flow, corresponding to a first identity identification and/or a second identity identification, of which a service data adaptation protocol (SDAP) layer is at the second slave base station, and a data forwarding address corresponding to the identity identification; a data forwarding is performed according to the identity identification and the data forwarding address; where the first identity identification is an identity identification of a flow configured for a first master base station, and the second identity identification is an identity identification of a flow configured for a newly added first slave base station; the data forwarding address includes a first tunnel address and/or a second tunnel address, the first tunnel address is configured to forward data to the first master base station, and the second tunnel address is configured to forward data to the first slave base station. Therefore, in the handover process, the target base station can provide two tunnel addresses for one PDU session, so that an SN node is added to the target base station, the SDAP layer of partial flow in one PDU session is configured at the MN, and the direct data forwarding to the target SN can be supported under the condition of configuring partial flow at the SN; the problem that in the related art, that the direct data forwarding to the target SN cannot be realized in a case that the target MN determines to configure the SDAP layer of partial flow in one PDU session on the MN and the other partial flow is configured at the SN scene, can be solved.

Specifically, the performing the data forwarding according to the identity identification and the data forwarding address includes: forwarding data to the first master base station and/or the first slave base station according to the identity identification and the data forwarding address.

A data forwarding method is further provided in some embodiments of the present disclosure further provide, which is applied to a first slave base station (specifically, but not limited to, a target slave base station SN in a dual connectivity scenario), as shown in FIG. 6, including:

Step 61: receiving data directly forwarded by a second master base station and/or a second slave base station.

According to the data forwarding method provided by some embodiments of the present disclosure, data directly forwarded by a second master base station and/or a second slave base station is received. Therefore, in the handover process, the target base station can provide two tunnel addresses for one PDU session, so that an SN node is added to the target base station, the SDAP layer of partial flow in one PDU session is configured at the MN, and the direct data forwarding to the target SN can be supported under the condition of configuring partial flow at the SN; the problem that in the related art, that the direct data forwarding to the target SN cannot be realized in a case that the target MN determines to configure the SDAP layer of partial flow in one PDU session on the MN and the other partial flow is configured at the SN scene, can be solved.

The data forwarding method provided by some embodiments of the present disclosure is further described below with reference to multiple sides, such as the first master base station, the second slave base station, and the first slave base station.

To solve the above technical problem, some embodiments of the present disclosure provide a data forwarding method, which mainly includes:

for the situation that the source side is a single connection scene and the target side is a double connection scene, if the target master base station receives the handover request of the source base station, a new SN node is determined to be added, and the SDAP layer of partial flow in a PDU session is determined to be configured at the MN node, and the SDAP layer of the other partial flow is configured at the SN node (the distribution can be carried out according to the load of the target MN and the target SN in the double connection scene); in this case, the target MN sends two data forwarding addresses of PDU-session-level (respectively, a tunnel allocated to the target MN and a tunnel allocated to the target SN) to the source base station, where each tunnel corresponds to a flow list, and indicates that data of all flows in the list needs to be forwarded to the address. The source base station forwards the corresponding flow (to be forwarded) data to the target MN and/or the target SN according to the information (i.e. the source base station can directly forward the data to the target MN and/or the target SN).

For the situation that both the source side and the target side are in a dual-connection scenario, if the target master base station receives a handover request of the source master base station, it determines to add a new SN node, and determines to configure a part of flows of the SDAP layer in a PDU session at the MN node, and another part of flow of the SDAP layer is configured at the SN node (it can allocate according to the loads of the target MN and the target SN); in this case, the target MN sends two addresses of data forwarding of PDU-session-level (respectively, a tunnel allocated to the target MN and a tunnel allocated to the target SN) to the source MN, where each tunnel corresponds to a list of flow, and indicates that data of all flows in the list needs to be forwarded to the address. The source MN and/or source SN can forward the corresponding flow (to be forwarded) to the target MN and/or target SN based on this information (i.e., the source MN can forward the data directly to the target MN and/or target SN, and/or the source SN can forward the data directly to the target MN and/or target SN).

The following exemplifies the solutions provided by some embodiments of the present disclosure, taking the source side as a dual connectivity scenario (specifically, the first master base station takes a target master base station MN in the dual connectivity scenario as an example, the second master base station takes a source master base station MN in the dual connectivity scenario as an example, the second slave base station takes a source slave base station SN in the dual connectivity scenario as an example, and the first slave base station takes a target slave base station SN in the dual connectivity scenario as an example).

For example, suppose that the UE is in dual connectivity, the serving base station (source primary base station) of the UE initiates an Xn handover process according to measurement report, and the target primary base station determines to add a new SgNB according to its own load condition and the measurement report of the UE. For PDU session 1 (containing four flows), the target MN decides to configure flows 1 and 2 at the MN and flows 3 and 4 at the SN.

Figure 7:
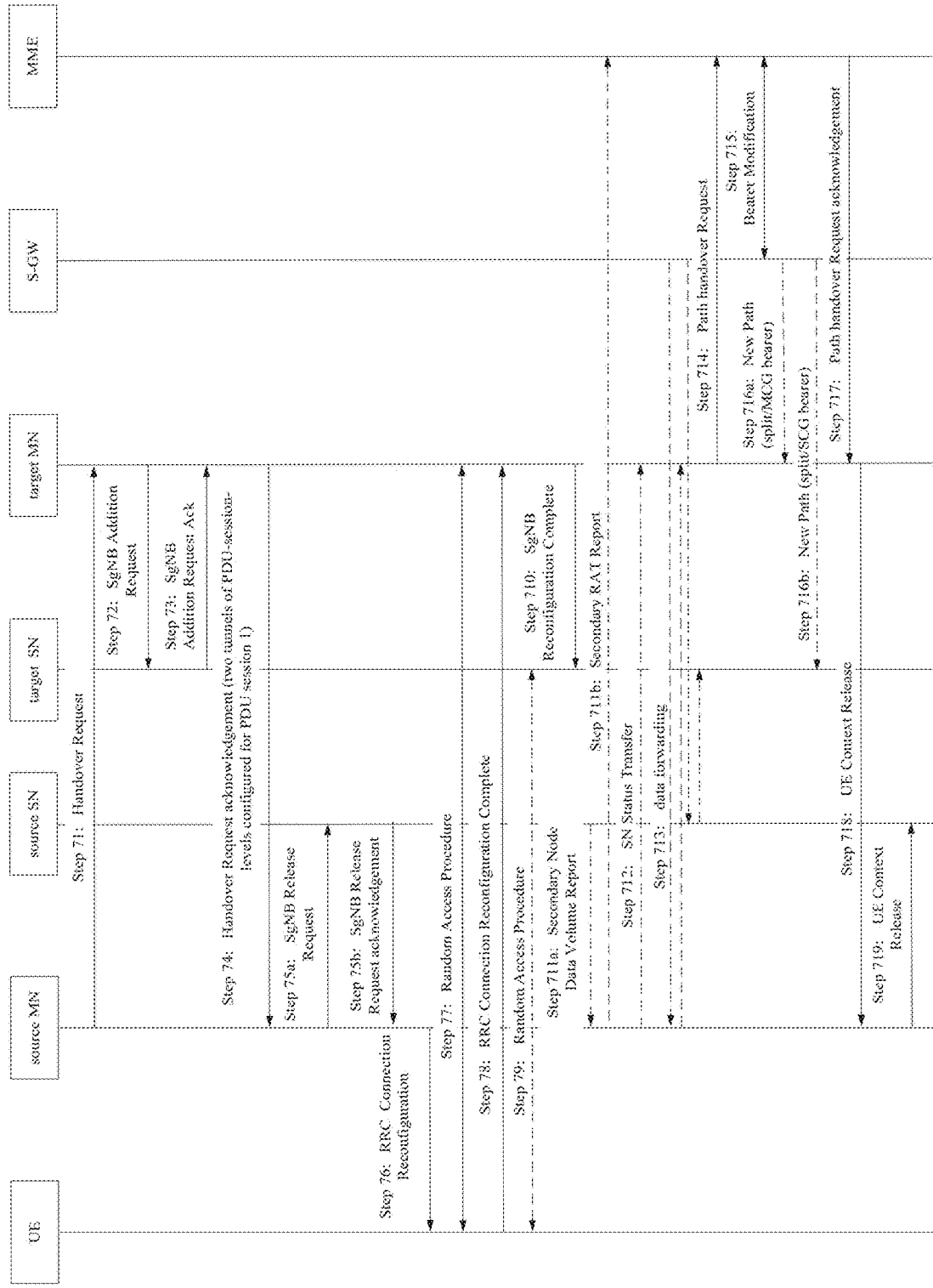
FIG. 7 is a first schematic application flow diagram of a data forwarding method according to some embodiments of the present disclosure.

As shown in FIG. 7, the solutions provided by some embodiments of the present disclosure may specifically include:

Step 71: the source master base station (source MN/source MN) sends a Handover Request message to the target master base station (target MN/target MN).

Step 72: the target MN sends a slave base station Addition Request SgNB Addition Request to the target slave base station (target SN/target SN).

Specifically, the target MN determines to add a new SN node according to the LOAD (LOAD) of the target MN, where flow 1 and 2 of PDU session 1 are configured at the MN node, and flow 3 and 4 are configured at the SN node.

The SDAP layers for flows 1, 2, 3, and 4 may be at the source MN or source SN, and are not limited herein.

Step 73: the target SN feeds back a slave base station Addition Request Ack SgNB Addition Request Ack to the target MN.

The target SN may provide an address of data forwarding of PDU session 1 (the address is an address for forwarding data to the target SN, and may be specifically a tunnel in step 74).

Step 74: the target MN feeds back a Handover Request acknowledgement (two tunnels of PDU-session-levels configured for PDU session 1) to the source MN.

Specifically, the target MN provides two data forwarding tunnels of PDU-session-level for PDU session 1 in the handover request ACK message for the source MN, and also provides a flow list corresponding to each tunnel (specifically, an idle tunnel ID may be allocated, the flow ID may be recorded in the handover request ACK message, and which flows correspond to one tunnel).

Step 75a: the source MN sends a Release Request SgNB Release Request to the source slave base station (source SN/source SN).

Specifically, the source MN may ask for the release of the source SN and provide an address for data forwarding (specifically, a tunnel allocated to the source SN and a corresponding flow list).

More specifically, that is, if the source side is also configured with dual connectivity, the source MN determines whether each flow is in the source SN or the source MN, and forwards an address of data forwarding corresponding to the flow to the source SN for the flow of the source SN in the SDAP layer.

Step 75b: the source SN feeds back a Release Request acknowledgement SgNB Release Request acknowledgement from the base station to the source MN.

Step 76: the source MN sends a radio resource control Connection Reconfiguration RRC Connection Reconfiguration message to the UE.

Step 77: entering a Random Access Procedure between the UE and the target MN.

Step 78: the UE transmits a radio resource control Connection Reconfiguration Complete RRC Connection Reconfiguration Complete message to the target MN.

With respect to steps 77 and 78, that is, the UE initiates a random access procedure to the target MN, synchronizes with the target MN, and replies to the RRC Connection Reconfiguration Complete message.

Step 79: and entering a Random Access Procedure between the UE and the target SN.

That is, the UE synchronizes to the target SN.

Step 710: the target MN sends a SgNB Reconfiguration Complete message from the base station to the target SN.

Specifically, if the radio bearer configuration is successful, the target MN notifies the target SN through an SgNB Reconfiguration Complete message.

Step 711a: the source SN sends a Secondary node Data Volume Report Secondary RAT Data Volume Report to the source MN.

Step 711b: and the source MN sends a Secondary node Report Secondary RAT Report to a mobility management entity MME.

Step 712: the source MN sends a sequence number Status Transfer SN Status Transfer message to the target MN.

SN here represents sequence number.

Step 713: the source MN forwards data and/or the source SN forwards data; the S-GW in the figure represents a serving gateway, the source MN forwards data to the target MN only schematically, and may also forward data to the target SN, and the source SN forwards data to the target SN only schematically, and may also forward data to the target MN, which is not limited herein.

That is, for steps 712 and 713, data forwarding from the source MN begins, as does data forwarding from the source SN: the source MN can forward data directly to the target MN and/or target SN, or the source SN can forward data directly to the target MN and/or target SN.

Step 714: the target MN sends a Path handover request Path Switch Request to the MME.

Step 715: carrying out Bearer Modification interactively between the S-GW and the MME.

Step 716a: the S-GW sends a New Path (split/master cell group bearer) New Path (split/MCG bearer) message to the target MN.

Step 716b: the S-GW sends a New Path (split/SCG bearer) New Path message to the target SN.

Step 717: the MME feeds back a Path Switch Request acknowledgement (Path Switch Request Acknowledge) to the target MN.

For steps 714 to 717, i.e., the target MN initiates the S1 path update procedure, here S1 refers to the S1 interface, and the S1 interface is the interface between the LTE eNodeB (base station) and the EPC (packet core network).

Step 718: the target MN sends a UE Context Release message of releasing the terminal Context to the source MN.

That is, the target MN initiates a UE Context Release procedure to the source MN.

Step 719: the source MN sends a terminal Context Release UE Context Release message to the source SN.

Specifically, once receiving the UE CONTEXT RELEASE message, the source SN may RELEASE resources of an air interface and a control plane, and data forwarding may be continuously performed.

For example, suppose that the UE is in dual connectivity, the serving base station of the UE initiates an NG handover process according to measurement report, and the target base station determines to add a new SgNB according to its own load condition and the measurement report of the UE. For PDU session 1 (containing four flows), the MN decides to configure flows 1 and 2 at the MN and flows 3 and 4 at the SN.

Figure 8:
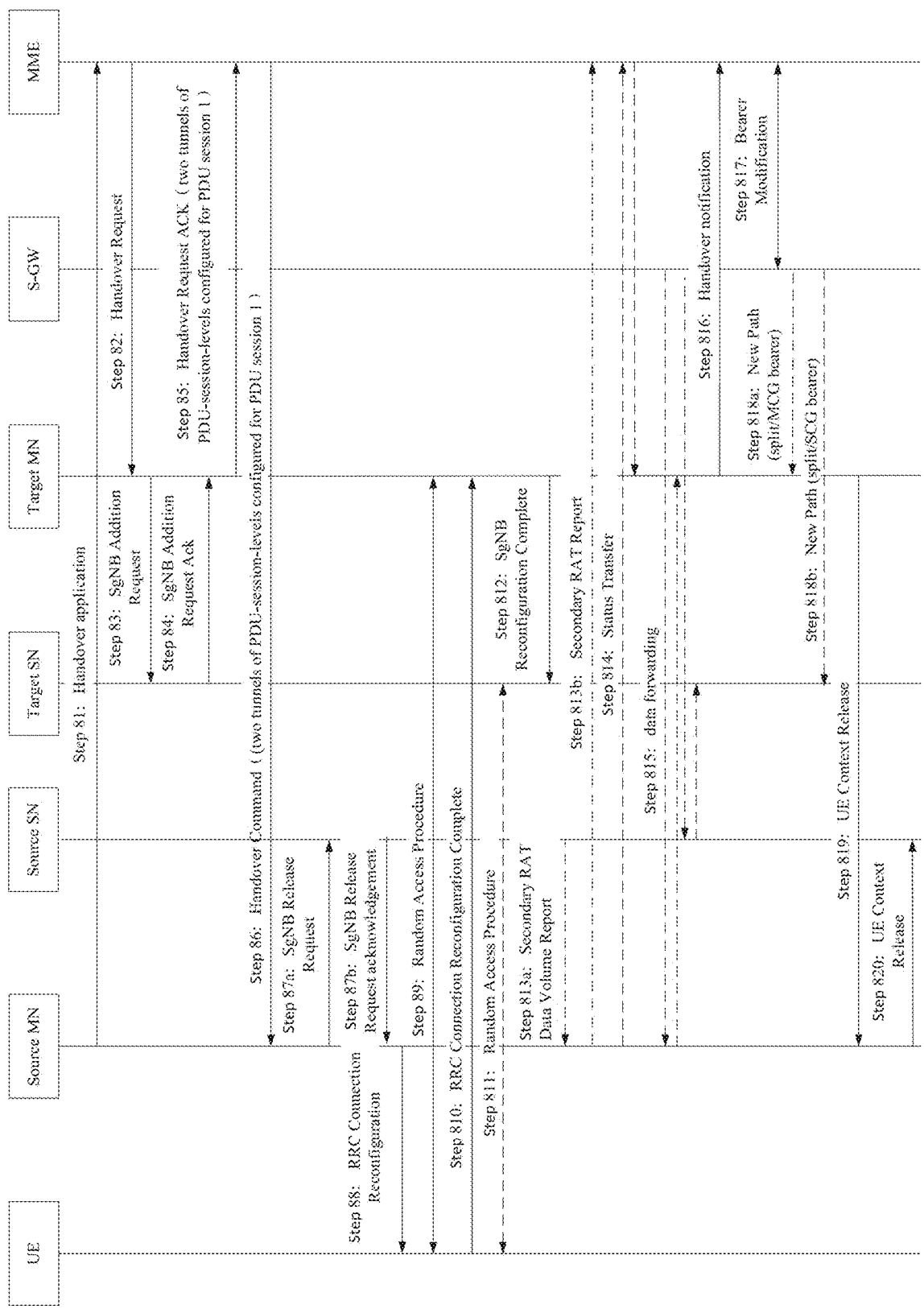
FIG. 8 is a second schematic application flow diagram of a data forwarding method according to some embodiments of the present disclosure.

As shown in FIG. 8, the solutions provided by some embodiments of the present disclosure may specifically include:

Step 81: a source master base station (source MN/source MN) sends a Handover application Required message to a mobility management entity MME.

Step 82: the MME sends a Handover Request message to a target master base station (target MN/target MN).

Step 83: the target MN sends a slave base station Addition Request SgNB Addition Request to the target slave base station (target SN/target SN).

Specifically, the target MN determines to add a new SN node according to the LOAD of the target MN, where flow 1 and 2 of PDU session 1 are configured in the MN node, and flow3 and 4 are configured in the SN node.

The SDAP layers for flows 1, 2, 3, and 4 may be at the source MN or source SN, and are not limited herein.

Step 84: the target SN feeds back a slave base station Addition Request Ack SgNB Addition Request Ack to the target MN.

The target SN may provide an address of data forwarding of PDU session 1 (the address is an address for forwarding data to the target SN, and may be specifically a tunnel in step 85).

Step 85: the target MN feeds back a Handover Request acknowledgement (two tunnels of PDU-session-levels configured for PDU session 1) to the MME.

Specifically, the target MN provides two data forwarding tunnels of PDU-session-level for PDU session 1 in the handover request ACK message of the MME, and also provides a flow list corresponding to each tunnel (specifically, a flow ID may be recorded in the idle tunnel ID. handover request ACK message, and which flows correspond to one tunnel).

Step 86: the MME sends a Handover Command (two tunnels of PDU-session-levels configured for PDU session 1) to the source MN.

Specifically, the MME provides two tunnels for data forwarding of PDU-session-level for PDU session 1 in the Handover Command for the source MN, and also provides a flow list corresponding to each tunnel (specifically, a flow ID may be recorded in the Handover Command message, and one tunnel corresponds to which flows).

Step 87*a*: the source MN sends a Release Request SgNB Release Request to the source slave base station (source SN/source SN).

Specifically, the source MN requests to release the source SN and provides an address for data forwarding (specifically, a tunnel allocated to the source SN and a corresponding flow list).

More specifically, that is, if the source side is also configured with dual connectivity, the source MN determines whether each flow is in the source SN or the source MN, and forwards an address of data forwarding corresponding to the flow to the source SN for the flow of the source SN in the SDAP layer.

Step 87*b*: the source SN feeds back a salve base station Release Request acknowledgement SgNB Release Request acknowledgement to the source MN.

Step 88: the source MN sends a radio resource control Connection Reconfiguration RRC Connection Reconfiguration message to the UE.

Step 89: and entering a Random Access Procedure between the UE and the target MN.

Step 810: the UE transmits a radio resource control Connection Reconfiguration Complete RRC Connection Reconfiguration Complete message to the target MN.

With respect to steps 89 and 810, that is, the UE initiates a random access procedure to the target MN, synchronizes with the target MN, and responds to the RRC Connection Reconfiguration Complete message.

Step 811: and entering a Random Access Procedure between the UE and the target SN.

That is, the UE synchronizes to the target SN.

Step 812: the target MN sends a SgNB Reconfiguration Complete message from the base station to the target SN.

Specifically, if the radio bearer configuration is successful, the target MN notifies the target SN through an SgNB Reconfiguration Complete message.

Step 813*a*: the source SN sends a Secondary node Data Volume Report Secondary RAT Data Volume Report to the source MN.

Step 813*b*: the source MN sends a Secondary node Report Secondary RAT Report to the MME.

Step 814: the source MN sends a sequence number Status Transfer SN Status Transfer message to the MME.

SN here represents sequence number.

Step 815: the source MN forwards data and/or the source SN forwards data; the S-GW in the figure represents a serving gateway, the source MN forwards data to the target MN only schematically, and may also forward data to the target SN, and the source SN forwards data to the target SN only schematically, and may also forward data to the target MN, which is not limited herein.

That is, for steps 814 and 815, data forwarding from the source MN begins, as data forwarding from the source SN: the source MN can forward data directly to the target MN and/or target SN, or the source SN can forward data directly to the target MN and/or target SN.

Step 816: the target MN sends a Handover notification to the MME.

Step 817: and carrying out Bearer Modification interactively between the S-GW and the MME.

Step 818*a*: the S-GW sends a New Path (split/master cell group bearer) New Path (split/MCG bearer) message to the target MN.

Step 818*b*: the S-GW sends a New Path (split/SCG bearer) New Path message to the target SN.

For step 816-818, the target MN initiates S1 path update procedure.

Step 819: the target MN sends a UE Context Release message of releasing the terminal Context to the source MN.

That is, the target MN initiates a UE Context Release procedure to the source MN.

Step 820: the source MN sends a terminal Context Release UE Context Release message to the source SN.

Specifically, once receiving the UE CONTEXT RELEASE message, the source SN may RELEASE resources of an air interface and a control plane, and data forwarding may be continuously performed.

As can be seen from the above, some embodiments of the present disclosure provide solutions involving:

(1) The target MN carries addresses of two PDU SESSION LEVELs for one PDU SESSION in a handover response message sent to a source base station in a single connection scene (or a source MN in a double connection scene), and simultaneously carries a flow ID corresponding to each address;

(2) if the source side is also configured with dual connectivity, the source MN will determine whether each flow is in the source SN or the source MN, and forward the address of data forwarding corresponding to the flow to the SN for the flow of the source SN in the SDAP layer.

In summary, in the solutions provided by some embodiments of the present disclosure, in the handover process, the target MN may provide a tunnel address of two PDU-session-levels for one PDU session, so that the target MN determines to add one SN node, and determines to configure the SDAP layer of partial flow under one PDU session in the MN, and the configuration of partial flow in the SN scenario may support direct data forwarding to the target SN.

A first master base station is further provide in some embodiments of the present disclosure, including a memory, a processor, a transceiver, and a computer program stored in the memory and executable by the processor; the processor executes the computer program to:

after a handover request message sent by a second master base station is received by the transceiver, if it is determined that a slave base station node is newly added, a service data adaptation protocol (SDAP) layer of a part of flows of a preset protocol data unit (PDU) session is configured at a master base station node, and an SDAP layer of the rest part of flows of the preset PDU is configured at the newly added slave base station node, send, through the transceiver, a handover request response message carrying first preset information to a second master base station;

where the first preset information includes: first identity identifications of all flows configured for the first master base station and data forwarding addresses corresponding to the first identity identifications, and second identity identifications of all flows configured for the newly added first slave base station and data forwarding addresses corresponding to the second identity identifications;

each of the data forwarding addresses corresponding to the first identity identifications is a first tunnel address, and the first tunnel address is configured to forward data to the first master base station; and each of the data forwarding addresses corresponding to the second identity identifications is a second tunnel address, and the second tunnel address is configured to forward data to the first slave base station.

According to the above embodiments, after a handover request message sent by a second master base station is received by the transceiver, if it is determined that a slave base station node is newly added, a service data adaptation protocol (SDAP) layer of a part of flows of a preset protocol data unit (PDU) session is configured at a master base station node, and an SDAP layer of the rest part of flows of the preset PDU is configured at the newly added slave base station node, a handover request response message carrying first preset information is sent, through the transceiver, to a second master base station; where the first preset information includes: first identity identifications of all flows configured for the first master base station and data forwarding addresses corresponding to the first identity identifications, and second identity identifications of all flows configured for the newly added first slave base station and data forwarding addresses corresponding to the second identity identifications; each of the data forwarding addresses corresponding to the first identity identifications is a first tunnel address, and the first tunnel address is configured to forward data to the first master base station; and each of the data forwarding addresses corresponding to the second identity identifications is a second tunnel address, and the second tunnel address is configured to forward data to the first slave base station. Therefore, in the handover process, the target base station can provide two tunnel addresses for one PDU session, so that an SN node is added to the target base station, the SDAP layer of partial flow in one PDU session is configured at the MN, and the direct data forwarding to the target SN can be supported under the condition of configuring partial flow at the SN; the problem that in the related art, that the direct data forwarding to the target SN cannot be realized in a case that the target MN determines to configure the SDAP layer of partial flow in one PDU session on the MN and the other partial flow is configured at the SN scene, can be solved.

Figure 9:
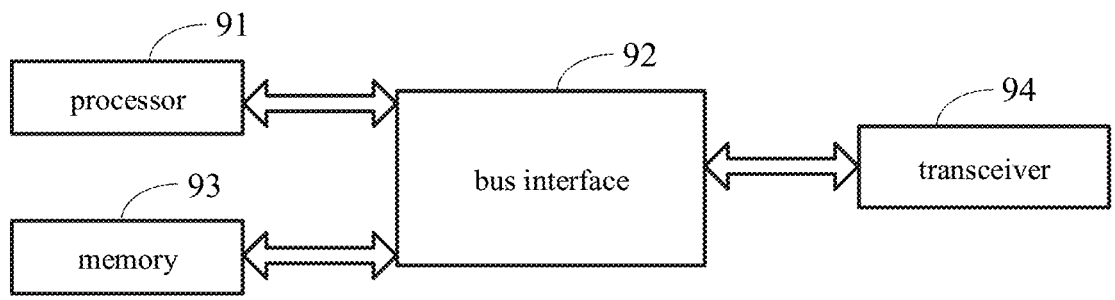
FIG. 9 is a schematic view of a first master base station according to some embodiments of the present disclosure.

Specifically, as shown in FIG. 9, the first master base station according to some embodiments of the present disclosure includes:

a processor 91; and a memory 93 connected to the processor 91 through a bus interface 92, wherein the memory 93 is used for storing programs and data used by the processor 91 in executing operations, and when the processor 91 calls and executes the programs and data stored in the memory 93, the following processes are executed:

after a handover request message sent by a second master base station is received by the transceiver 94, if it is determined that a slave base station node is newly added, a service data adaptation protocol (SDAP) layer of a part of flows of a preset protocol data unit (PDU) session is configured at a master base station node, and an SDAP layer of the rest part of flows of the preset PDU is configured at the newly added slave base station node, send, through the transceiver 94, a handover request response message carrying first preset information to a second master base station;

the first preset information includes: first identity identifications of all flows configured for the first master base station and data forwarding addresses corresponding to the first identity identifications, and second identity identifications of all flows configured for the newly added first slave base station and data forwarding addresses corresponding to the second identity identifications;

each of the data forwarding addresses corresponding to the first identity identifications is a first tunnel address, and the first tunnel address is configured to forward data to the first master base station; and each of the data forwarding addresses corresponding to the second identity identifications is a second tunnel address, and the second tunnel address is configured to forward data to the first slave base station.

The transceiver 94 is connected to the bus interface 92 for receiving and transmitting data under control of the processor 91.

It should be noted that in FIG. 9, the bus architecture may include any number of interconnected buses and bridges, with one or more processors represented by processor 91 and various circuits represented by memory 93 being linked together. The bus architecture may also link together various other circuits such as peripherals, voltage regulators, power management circuits, and the like, which are well known in the art, and therefore, will not be described any further herein. The bus interface provides an interface. The transceiver 94 may be a plurality of elements, including a transmitter and a transceiver, providing a means for communicating with various other apparatus over a transmission medium. The processor 91 is responsible for managing the bus architecture and general processing, and the memory 93 may store data used by the processor 91 in performing operations.

Those skilled in the art will understand that all or part of the steps for implementing the above embodiments may be implemented by hardware, or may be implemented by a computer program instructing relevant hardware, where the computer program includes instructions for executing all or part of the steps of the above methods; and the computer program may be stored in a readable storage medium, which may be any form of storage medium.

Specifically, the data forwarding address is a data forwarding address of a PDU-session-level for a preset PDU session.

Further, the processor is further configured to: receive, through the transceiver, data directly forwarded by the second master base station and/or the second slave base station, after the handover request response message carrying the first preset information is sent to the second master base station.

The implementation embodiments of the data forwarding method on the first master base station side are all applicable to the embodiment of the first master base station, and the same technical effects can be achieved.

A second master base station is further provided in some embodiments of the present disclosure, including a memory, a processor, a transceiver, and a computer program stored in the memory and executable by the processor; the processor executes the computer program to:

receive, through the transceiver, a handover request response message carrying first preset information sent by a first master base station, where the first preset information includes: first identity identifications of all flows configured for the first master base station and data forwarding addresses corresponding to the first identity identifications, and second identity identifications of all flows configured for a newly added first slave base station and data forwarding addresses corresponding to the second identity identifications; and perform a data forwarding, through the transceiver, according to the first identity identifications, the data forwarding addresses corresponding to the first identity identifications, the second identity identifications and the data forwarding addresses corresponding to the second identity identifications.

According to the above embodiments, the second master base station receive, through the transceiver, a handover request response message carrying first preset information sent by a first master base station, where the first preset information includes: first identity identifications of all flows configured for the first master base station and data forwarding addresses corresponding to the first identity identifications, and second identity identifications of all flows configured for a newly added first slave base station and data forwarding addresses corresponding to the second identity identifications; and perform a data forwarding, through the transceiver, according to the first identity identifications, the data forwarding addresses corresponding to the first identity identifications, the second identity identifications and the data forwarding addresses corresponding to the second identity identifications. Therefore, in the handover process, the target base station can provide two tunnel addresses for one PDU session, so that an SN node is added to the target base station, the SDAP layer of partial flow in one PDU session is configured at the MN, and the direct data forwarding to the target SN can be supported under the condition of configuring partial flow at the SN; the problem that in the related art, that the direct data forwarding to the target SN cannot be realized in a case that the target MN determines to configure the SDAP layer of partial flow in one PDU session on the MN and the other partial flow is configured at the SN scene, can be solved.

Figure 10:
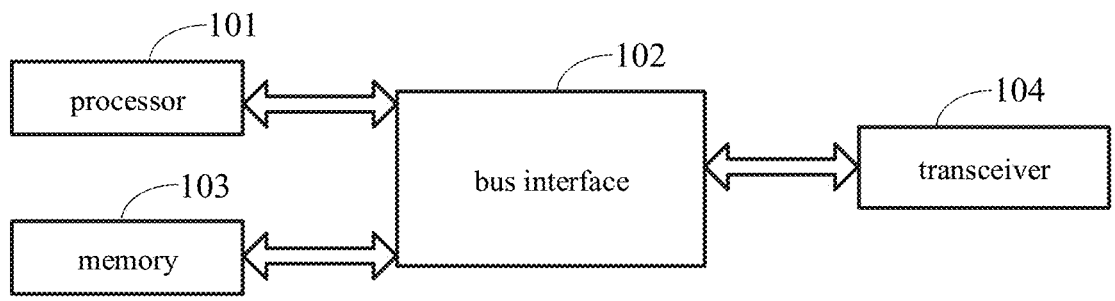
FIG. 10 is a schematic view of a second master base station according to some embodiments of the present disclosure.

Specifically, as shown in FIG. 10, the second master base station according to some embodiments of the present disclosure includes:

a processor 101; and a memory 103 connected to the processor 101 through a bus interface 102, wherein the memory 103 is used for storing programs and data used by the processor 101 in executing operations, and when the processor 101 calls and executes the programs and data stored in the memory 103 to:

receive, through the transceiver, a handover request response message carrying first preset information sent by a first master base station, where the first preset information includes: first identity identifications of all flows configured for the first master base station and data forwarding addresses corresponding to the first identity identifications, and second identity identifications of all flows configured for a newly added first slave base station and data forwarding addresses corresponding to the second identity identifications; and perform a data forwarding, through the transceiver, according to the first identity identifications, the data forwarding addresses corresponding to the first identity identifications, the second identity identifications and the data forwarding addresses corresponding to the second identity identifications.

The transceiver 104 is coupled to the bus interface 102 for receiving and transmitting data under the control of the processor 101.

It is noted that in FIG. 10, the bus architecture may include any number of interconnected buses and bridges, with one or more processors represented by processor 101 and various circuits represented by memory 103 being linked together. The bus architecture may also link together various other circuits such as peripherals, voltage regulators, power management circuits, and the like, which are well known in the art, and therefore, will not be described any further herein. The bus interface provides an interface. The transceiver 104 may be a plurality of elements, including a transmitter and a transceiver, providing a means for communicating with various other apparatus over a transmission medium. The processor 101 is responsible for managing the bus architecture and general processing, and the memory 103 may store data used by the processor 101 in performing operations.

Those skilled in the art will understand that all or part of the steps for implementing the above embodiments may be implemented by hardware, or may be implemented by a computer program instructing relevant hardware, where the computer program includes instructions for executing all or part of the steps of the above methods; and the computer program may be stored in a readable storage medium, which may be any form of storage medium.

The processor is further configured to: acquire the first identity identification which is matched with an identity identification of a flow of which a service data adaptation protocol (SDAP) layer is at the second master base station; forward the flow corresponding to the acquired first identity identification according to the data forwarding address corresponding to the acquired first identity identification; and/or acquire the second identity identification which is matched with an identity identification of a flow of which a service data adaptation protocol (SDAP) layer is at the second master base station; forward the flow corresponding to the acquired second identity identification according to the data forwarding address corresponding to the acquired second identity identification.

Specifically, the processor is further configured to: forward, through the transceiver, data to the first master base station and/or the first slave base station according to the first identity identifications, the data forwarding addresses corresponding to the first identity identifications, the second identity identifications and the data forwarding addresses corresponding to the second identity identifications.

Further, the processor is further configured to: prior to performing the data forwarding according to the first identity identifications, the data forwarding addresses corresponding to the first identity identifications, the second identity identifications and the data forwarding addresses corresponding to the second identity identifications, send, through the transceiver, a slave base station release request carrying second preset information to a second slave base station, according to the first identity identifications, the data forwarding addresses corresponding to the first identity identifications, the second identity identifications and the data forwarding addresses corresponding to the second identity identifications; where the second preset information includes: the identity identification of the flow, corresponding to the first identity identification and/or the second identity identification, of which an SDAP layer is at the second slave base station, and the data forwarding address corresponding to the identity identification; each of the data forwarding addresses corresponding to the first identity identifications is a first tunnel address, and the first tunnel address is configured to forward data to the first master base station; and each of the data forwarding addresses corresponding to the second identity identifications is a second tunnel address, and the second tunnel address is configured to forward data to the first slave base station.

Specifically, the processor is further configured to: acquire the identity identification of the flow, corresponding to the first identity identification and/or the second identity identification, of which the SDAP layer is at the second slave base station, and the data forwarding address corresponding to the identity identification; send, through the transceiver, the slave base station release request carrying the second preset information to the second slave base station, according to the identity identification and the data forwarding address corresponding to the identity identification.

The implementation embodiments of the data forwarding method on the second master base station side are all applicable to the embodiment of the second master base station, and the same technical effects can be achieved.

A second slave base station is further provided in some embodiments of the present disclosure, including a memory, a processor, a transceiver, and a computer program stored in the memory and executable by the processor; the processor implements the following steps when executing the computer program:
  receive, through the transceiver, a slave base station release request which is sent by a second master base station and carries second preset information, where the second preset information includes: an identity identification of a flow, corresponding to a first identity identification and/or a second identity identification, of which a service data adaptation protocol (SDAP) layer is at the second slave base station, and a data forwarding address corresponding to the identity identification;
  perform a data forwarding, through the transceiver, according to the identity identification and the data forwarding address;
  the first identity identification is an identity identification of a flow configured for a first master base station, and the second identity identification is an identity identification of a flow configured for a newly added first slave base station;
  the data forwarding address includes a first tunnel address and/or a second tunnel address, the first tunnel address is configured to forward data to the first master base station, and the second tunnel address is configured to forward data to the first slave base station.

According to the above embodiments, the second slave base station receives, through the transceiver, a slave base station release request which is sent by a second master base station and carries second preset information, where the second preset information includes: an identity identification of a flow, corresponding to a first identity identification and/or a second identity identification, of which a service data adaptation protocol (SDAP) layer is at the second slave base station, and a data forwarding address corresponding to the identity identification; performs a data forwarding, through the transceiver, according to the identity identification and the data forwarding address; the first identity identification is an identity identification of a flow configured for a first master base station, and the second identity identification is an identity identification of a flow configured for a newly added first slave base station; the data forwarding address includes a first tunnel address and/or a second tunnel address, the first tunnel address is configured to forward data to the first master base station, and the second tunnel address is configured to forward data to the first slave base station. Therefore, in the handover process, the target base station can provide two tunnel addresses for one PDU session, so that an SN node is added to the target base station, the SDAP layer of partial flow in one PDU session is configured at the MN, and the direct data forwarding to the target SN can be supported under the condition of configuring partial flow at the SN; the problem that in the related art, that the direct data forwarding to the target SN cannot be realized in a case that the target MN determines to configure the SDAP layer of partial flow in one PDU session on the MN and the other partial flow is configured at the SN scene, can be solved Specifically, as shown in FIG. 11, the second slave base station in some embodiments of the present disclosure includes:
  a processor 111; and a memory 113 connected to the processor 111 through a bus interface 112, wherein the memory 113 is used for storing programs and data used by the processor 111 in executing operations, and when the processor 111 calls and executes the programs and data stored in the memory 113, the following procedures are executed:
  receive, through the transceiver 114, a slave base station release request which is sent by a second master base station and carries second preset information, where the second preset information includes: an identity identification of a flow, corresponding to a first identity identification and/or a second identity identification, of which a service data adaptation protocol (SDAP) layer is at the second slave base station, and a data forwarding address corresponding to the identity identification;
  perform a data forwarding, through the transceiver 114, according to the identity identification and the data forwarding address;
  the first identity identification is an identity identification of a flow configured for a first master base station, and the second identity identification is an identity identification of a flow configured for a newly added first slave base station;
  the data forwarding address includes a first tunnel address and/or a second tunnel address, the first tunnel address is configured to forward data to the first master base station, and the second tunnel address is configured to forward data to the first slave base station.

The transceiver 114 is coupled to the bus interface 112 for receiving and transmitting data under the control of the processor 111.

Figure 11:
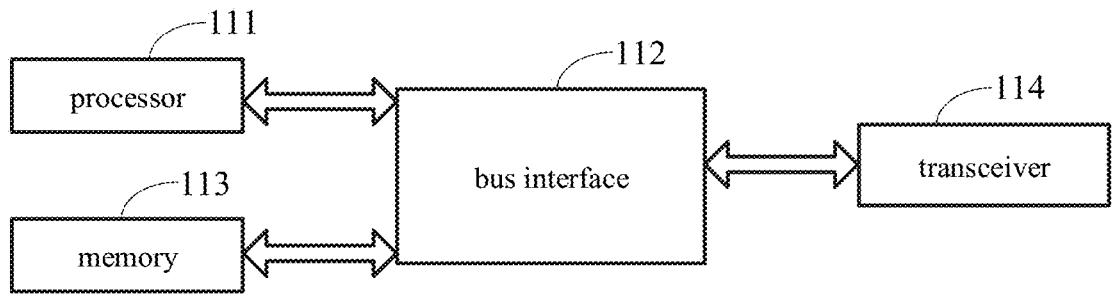
FIG. 11 is a schematic view of a second slave base station according to some embodiments of the present disclosure.

It should be noted that in FIG. 11, the bus architecture may include any number of interconnected buses and bridges, with one or more processors represented by processor 111 and various circuits of memory represented by memory 113 being linked together. The bus architecture may also link together various other circuits such as peripherals, voltage regulators, power management circuits, and the like, which are well known in the art, and therefore, will not be described any further herein. The bus interface provides an interface. The transceiver 114 may be a plurality of elements, including a transmitter and a transceiver, providing a means for communicating with various other apparatus over a transmission medium. The processor 111 is responsible for managing the bus architecture and general processing, and the memory 113 may store data used by the processor 111 in performing operations.

Those skilled in the art will understand that all or part of the steps for implementing the above embodiments may be implemented by hardware, or may be implemented by a computer program instructing relevant hardware, where the computer program includes instructions for executing all or part of the steps of the above methods; and the computer program may be stored in a readable storage medium, which may be any form of storage medium.

Specifically, the processor is further configured to: forward, through the transceiver, data to the first master base station and/or the first slave base station according to the identity identification and the data forwarding address.

The implementation embodiments of the data forwarding method of the second slave base station side are all applied to the embodiment of the second slave base station, and the same technical effects can be achieved.

A first slave base station is further provided in some embodiments of the present disclosure, including: a memory, a processor, a transceiver, and a computer program stored in the memory and executable by the processor; the processor implements the following steps when executing the program:

receive, by the transceiver, data directly forwarded by a second master base station and/or a second slave base station.

According to the above embodiments, the first slave base station receives, by the transceiver, data directly forwarded by a second master base station and/or a second slave base station. Therefore, in the handover process, the target base station can provide two tunnel addresses for one PDU session, so that an SN node is added to the target base station, the SDAP layer of partial flow in one PDU session is configured at the MN, and the direct data forwarding to the target SN can be supported under the condition of configuring partial flow at the SN; the problem that in the related art, that the direct data forwarding to the target SN cannot be realized in a case that the target MN determines to configure the SDAP layer of partial flow in one PDU session on the MN and the other partial flow is configured at the SN scene, can be solved.

Figure 12:
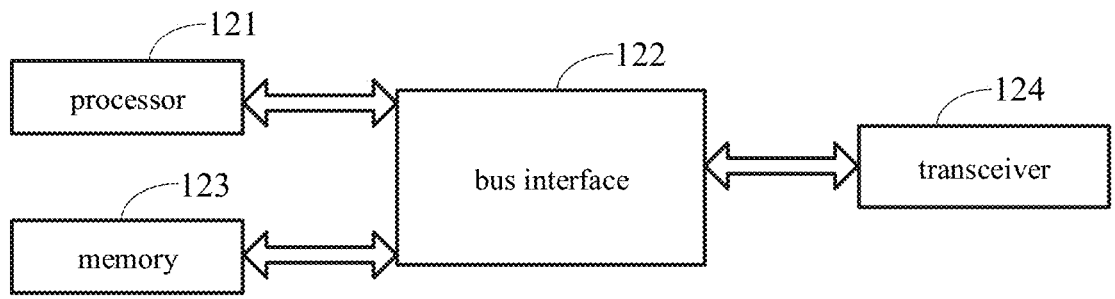
FIG. 12 is a schematic view of a first slave base station according to some embodiments of the present disclosure.

Specifically, as shown in FIG. 12, the first slave base station according to some embodiments of the present disclosure includes:

a processor 121; and a memory 123 connected to the processor 121 through a bus interface 122, wherein the memory 123 is used for storing programs and data used by the processor 121 in executing operations, and when the processor 121 calls and executes the programs and data stored in the memory 123, the following processes are executed:

receive, by the transceiver 124, data directly forwarded by a second master base station and/or a second slave base station.

The transceiver 124 is coupled to the bus interface 122 for receiving and transmitting data under the control of the processor 121.

It should be noted that in FIG. 12, the bus architecture may include any number of interconnected buses and bridges, with one or more processors represented by processor 121 and various circuits represented by memory 123 being linked together. The bus architecture may also link together various other circuits such as peripherals, voltage regulators, power management circuits, and the like, which are well known in the art, and therefore, will not be described any further herein. The bus interface provides an interface. The transceiver 124 may be a plurality of elements, including a transmitter and a transceiver, providing a means for communicating with various other apparatus over a transmission medium. The processor 121 is responsible for managing the bus architecture and general processing, and the memory 123 may store data used by the processor 121 in performing operations.

Those skilled in the art will understand that all or part of the steps for implementing the above embodiments may be implemented by hardware, or may be implemented by a computer program instructing relevant hardware, where the computer program includes instructions for executing all or part of the steps of the above methods; and the computer program may be stored in a readable storage medium, which may be any form of storage medium.

The implementation embodiments of the data forwarding method of the first slave base station side are all applied to the embodiment of the first slave base station, and the same technical effect can be achieved.

A computer-readable storage medium is further provided in some embodiments of the present disclosure, on which a computer program is stored, the computer program is executed by a processor to perform the data forwarding method at the first master base station side; or the computer program is executed by a processor to perform the data forwarding method at the second master base station side; or the computer program is executed by a processor to perform the data forwarding method at the second slave base station side; or the computer program is executed by a processor to perform the data forwarding method at the first slave base station side.

The program when executed by the processor implements the steps of the data forwarding method as described above for the first slave base station side.

The implementation embodiments of the data forwarding method at the first master base station side, the second slave base station side, and/or the first slave base station side are all applicable to the embodiment of the computer-readable storage medium, and the same technical effects can be achieved.

Figure 13:
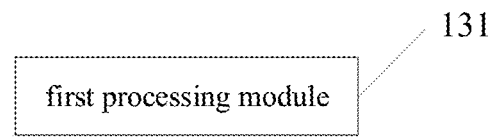
FIG. 13 is a first schematic view of a data forwarding device according to some embodiments of the present disclosure.

A data forwarding device is further provided in some embodiments of the present disclosure further provide, which is applied to a first master base station, as shown in FIG. 13, the data forwarding device includes:

a first processing module 131, configured to, after a handover request message sent by a second master base station is received, if it is determined that a slave base station node is newly added, a service data adaptation protocol (SDAP) layer of a part of flows of a preset protocol data unit (PDU) session is configured at a master base station node, and an SDAP layer of the rest part of flows of the preset PDU is configured at the newly added slave base station node, send a handover request response message carrying first preset information to a second master base station;

the first preset information includes: first identity identifications of all flows configured for the first master base station and data forwarding addresses corresponding to the first identity identifications, and second identity identifications of all flows configured for the newly added first slave base station and data forwarding addresses corresponding to the second identity identifications;

each of the data forwarding addresses corresponding to the first identity identifications is a first tunnel address, and the first tunnel address is configured to forward data to the first master base station; and each of the data forwarding addresses corresponding to the second identity identifications is a second tunnel address, and the second tunnel address is configured to forward data to the first slave base station.

According to the data forwarding device in the embodiments of the present disclosure, after receiving a handover request message sent by a second master base station, if it is determined that a slave base station node is newly added, a service data adaptation protocol (SDAP) layer of a part of flows of a preset protocol data unit (PDU) session is configured at a master base station node, and an SDAP layer of the rest part of flows of the preset PDU is configured at the newly added slave base station node, a handover request response message carrying first preset information is sent to a second master base station, where the first preset information includes: first identity identifications of all flows configured for the first master base station and data forwarding addresses corresponding to the first identity identifications, and second identity identifications of all flows configured for the newly added first slave base station and data forwarding addresses corresponding to the second identity identifications, each of the data forwarding addresses corresponding to the first identity identifications is a first tunnel address, and the first tunnel address is configured to forward data to the first master base station, and each of the data forwarding addresses corresponding to the second identity identifications is a second tunnel address, and the second tunnel address is configured to forward data to the first slave base station. Therefore, in the handover process, the target base station can provide two tunnel addresses for one PDU session, so that an SN node is added to the target base station, the SDAP layer of partial flow in one PDU session is configured at the MN, and the direct data forwarding to the target SN can be supported under the condition of configuring partial flow at the SN; the problem that in the related art, that the direct data forwarding to the target SN cannot be realized in a case that the target MN determines to configure the SDAP layer of partial flow in one PDU session on the MN and the other partial flow is configured at the SN scene, can be solved.

Further, the data forwarding device further includes: a first receiving module, configured to, after the handover request response message carrying the first preset information is sent to the second master base station, receive data directly forwarded by the second master base station and/or the second slave base station.

The implementation embodiments of the data forwarding method on the first master base station side are all applicable to the embodiment of the data forwarding device, and the same technical effects can be achieved.

Figure 14:
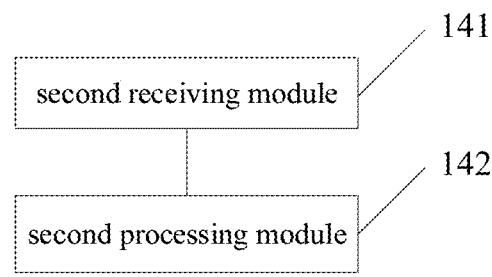
FIG. 14 is a second schematic view of a data forwarding device according to some embodiments of the present disclosure.

A data forwarding device is further provided in some embodiments of the present disclosure further provide, which is applied to the second master base station, as shown in FIG. 14, and includes:

a second receiving module 141, configured to receive a handover request response message carrying first preset information sent by a first master base station, where the first preset information includes: first identity identifications of all flows configured for the first master base station and data forwarding addresses corresponding to the first identity identifications, and second identity identifications of all flows configured for a newly added first slave base station and data forwarding addresses corresponding to the second identity identifications; and a second processing module 142, configured to perform a data forwarding, according to the first identity identifications, the data forwarding addresses corresponding to the first identity identifications, the second identity identifications and the data forwarding addresses corresponding to the second identity identifications.

According to the data forwarding device provided by some embodiments of the present disclosure, a handover request response message carrying first preset information sent by a first master base station is received, where the first preset information includes: first identity identifications of all flows configured for the first master base station and data forwarding addresses corresponding to the first identity identifications, and second identity identifications of all flows configured for a newly added first slave base station and data forwarding addresses corresponding to the second identity identifications; a data forwarding is performed, according to the first identity identifications, the data forwarding addresses corresponding to the first identity identifications, the second identity identifications and the data forwarding addresses corresponding to the second identity identifications. Therefore, in the handover process, the target base station can provide two tunnel addresses for one PDU session, so that an SN node is added to the target base station, the SDAP layer of partial flow in one PDU session is configured at the MN, and the direct data forwarding to the target SN can be supported under the condition of configuring partial flow at the SN; the problem that in the related art, that the direct data forwarding to the target SN cannot be realized in a case that the target MN determines to configure the SDAP layer of partial flow in one PDU session on the MN and the other partial flow is configured at the SN scene, can be solved.

The second processing module includes: a first acquiring sub-module, configured to acquire the first identity identification which is matched with an identity identification of a flow of which a service data adaptation protocol (SDAP) layer is at the second master base station; a first processing sub-module, configured to forward the flow corresponding to the acquired first identity identification according to the data forwarding address corresponding to the acquired first identity identification; and/or a second acquiring sub-module, configured to acquire the second identity identification which is matched with an identity identification of a flow of which a service data adaptation protocol (SDAP) layer is at the second master base station; a second processing sub-module, configured to forward the flow corresponding to the acquired second identity identification according to the data forwarding address corresponding to the acquired second identity identification.

Specifically, the second processing module includes: a third processing sub-module, configured to forward data to the first master base station and/or the first slave base station according to the first identity identifications, the data forwarding addresses corresponding to the first identity identifications, the second identity identifications and the data forwarding addresses corresponding to the second identity identifications.

Further, the data forwarding device further includes: a first sending module, configured to, before the data forwarding is performed according to the first identity identifications, the data forwarding addresses corresponding to the first identity identifications, the second identity identifications and the data forwarding addresses corresponding to the second identity identifications, send a slave base station release request carrying second preset information to a second slave base station, according to the first identity identifications, the data forwarding addresses corresponding to the first identity identifications, the second identity identifications and the data forwarding addresses corresponding to the second identity identifications; where the second preset information includes: the identity identification of the flow, corresponding to the first identity identification and/or the second identity identification, of which the SDAP layer is at the second slave base station, and the data forwarding address corresponding to the identity identification; each of the data forwarding addresses corresponding to the first identity identifications is a first tunnel address, and the first tunnel address is configured to forward data to the first master base station; and each of the data forwarding addresses corresponding to the second identity identifications is a second tunnel address, and the second tunnel address is configured to forward data to the first slave base station.

Specifically, the first sending module includes: a third acquiring sub-module, configured to acquire the identity identification of the flow, corresponding to the first identity identification and/or the second identity identification, of which the SDAP layer is at the second slave base station, and the data forwarding address corresponding to the identity identification; a first sending sub-module, configured to send the slave base station release request carrying the second preset information to the second slave base station, according to the identity identification and the data forwarding address corresponding to the identity identification.

The implementation embodiments of the data forwarding method on the second master base station side are all applicable to the embodiment of the data forwarding device, and the same technical effects can be achieved.

Figure 15:
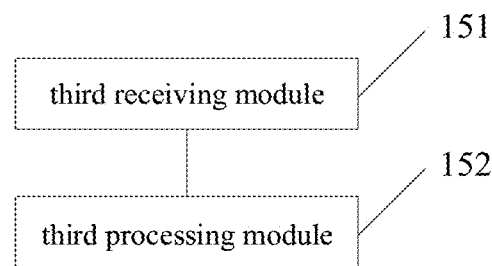
FIG. 15 is a third schematic view of a data forwarding device according to some embodiments of the present disclosure.

A data forwarding device is further provided in some embodiments of the present disclosure further provide, which is applied to a second slave base station, as shown in FIG. 15, the data forwarding device includes:
  a third receiving module 151, configured to receive a slave base station release request which is sent by a second master base station and carries second preset information, where the second preset information includes: an identity identification of a flow, corresponding to a first identity identification and/or a second identity identification, of which a service data adaptation protocol (SDAP) layer is at the second slave base station, and a data forwarding address corresponding to the identity identification;
  a third processing module 152, configured to perform a data forwarding according to the identity identification and the data forwarding address;
  the first identity identification is an identity identification of a flow configured for a first master base station, and the second identity identification is an identity identification of a flow configured for a newly added first slave base station;
  the data forwarding address includes a first tunnel address and/or a second tunnel address, the first tunnel address is configured to forward data to the first master base station, and the second tunnel address is configured to forward data to the first slave base station.

According to the data forwarding device provided by some embodiments of the present disclosure, a slave base station release request which is sent by a second master base station and carries second preset information is received, where the second preset information includes: an identity identification of a flow, corresponding to a first identity identification and/or a second identity identification, of which a service data adaptation protocol (SDAP) layer is at the second slave base station, and a data forwarding address corresponding to the identity identification; a data forwarding is performed according to the identity identification and the data forwarding address; where the first identity identification is an identity identification of a flow configured for a first master base station, and the second identity identification is an identity identification of a flow configured for a newly added first slave base station; the data forwarding address includes a first tunnel address and/or a second tunnel address, the first tunnel address is configured to forward data to the first master base station, and the second tunnel address is configured to forward data to the first slave base station. Therefore, in the handover process, the target base station can provide two tunnel addresses for one PDU session, so that an SN node is added to the target base station, the SDAP layer of partial flow in one PDU session is configured at the MN, and the direct data forwarding to the target SN can be supported under the condition of configuring partial flow at the SN; the problem that in the related art, that the direct data forwarding to the target SN cannot be realized in a case that the target MN determines to configure the SDAP layer of partial flow in one PDU session on the MN and the other partial flow is configured at the SN scene, can be solved.

Specifically, the third processing module includes: a fourth processing sub-module, configured to forward data to the first master base station and/or the first slave base station according to the identity identification and the data forwarding address.

The implementation embodiments of the data forwarding method of the second slave base station side are all applied to the embodiment of the data forwarding device, and the same technical effects can be achieved.

Figure 16:
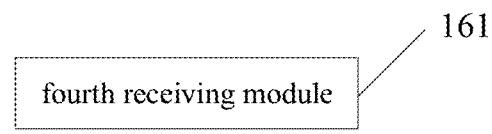
FIG. 16 is a fourth schematic view of a data forwarding device according to some embodiments of the present disclosure.

A data forwarding device is further provided in some embodiments of the present disclosure further provide, which is applied to a first slave base station, as shown in FIG. 16, the data forwarding device includes:
  a fourth receiving module 161, configured to receive data directly forwarded by a second master base station and/or a second slave base station.

According to the data forwarding device provided by some embodiments of the present disclosure, data directly forwarded by a second master base station and/or a second slave base station is received. Therefore, in the handover process, the target base station can provide two tunnel addresses for one PDU session, so that an SN node is added to the target base station, the SDAP layer of partial flow in one PDU session is configured at the MN, and the direct data forwarding to the target SN can be supported under the condition of configuring partial flow at the SN; the problem that in the related art, that the direct data forwarding to the target SN cannot be realized in a case that the target MN determines to configure the SDAP layer of partial flow in one PDU session on the MN and the other partial flow is configured at the SN scene, can be solved.

The implementation embodiments of the data forwarding method of the first slave base station side are all applied to the embodiment of the data forwarding device, and the same technical effects can be achieved.

It should be noted that many of the functional components described in this specification are referred to as modules/submodules to more particularly emphasize their implementation independence.

In some embodiments of the present disclosure, the modules/sub-modules may be implemented in software for execution by various types of processors. An identified module of executable code may, for instance, comprise one or more physical or logical blocks of computer instructions which may, for instance, be constructed as an object, procedure, or function. Nevertheless, the executables of an identified module need not be physically located together, but may comprise disparate instructions stored in different bits which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified within modules, and may be embodied in any suitable form and organized within any suitable type of data structure. The operational data may be collected as a single data set, or may be distributed over different locations including over different storage devices, and may exist, at least partially, merely as electronic signals on a system or network.

When a module can be implemented by software, considering the level of hardware technology in the related art, a module that can be implemented by software may build a corresponding hardware circuit to implement the corresponding function, without considering the cost, and the hardware circuit includes a conventional Very Large Scale Integration (VLSI) circuit or a gate array and related art semiconductors such as logic chips, transistors, or other discrete components. A module may also be implemented in programmable hardware devices such as field programmable gate arrays, programmable array logic, programmable logic devices or the like.

While the foregoing is directed to embodiments of the present disclosure, it will be appreciated by those skilled in the art that various changes and modifications may be made without departing from the principles of the disclosure, and it is intended that such changes and modifications be considered as within the scope of the disclosure.

What is claimed is:

1. A data forwarding method, applied to a first master base station and comprising:

after receiving a handover request message sent by a second master base station, if it is determined that a slave base station node is added, a service data adaptation protocol (SDAP) layer of a part of flows of a preset protocol data unit (PDU) session is configured at a master base station node, and an SDAP layer of the rest part of flows of the preset PDU is configured at the added slave base station node, sending a handover request response message carrying first preset information to a second master base station;

wherein the first preset information comprises: first identity identifications of all flows configured for the first master base station and data forwarding addresses corresponding to the first identity identifications, and second identity identifications of all flows configured for a first slave base station which is added and data forwarding addresses corresponding to the second identity identifications;

each of the data forwarding addresses corresponding to the first identity identifications is a first tunnel address, and the first tunnel address is configured to forward data to the first master base station; and each of the data forwarding addresses corresponding to the second identity identifications is a second tunnel address, and the second tunnel address is configured to forward data to the first slave base station.

2. The data forwarding method according to claim 1, wherein each of the data forwarding addresses corresponding to the first identity identifications and the second identity identifications is a PDU-session-level data forwarding address for a preset PDU session.

3. The data forwarding method according to claim 1, wherein subsequent to the sending the handover request response message carrying the first preset information to the second master base station, the method further comprises:

receiving data directly forwarded by the second master base station and/or a second slave base station.

4. A first master base station, comprising a memory, a processor, a transceiver and a computer program stored in the memory and executable by the processor; wherein the processor executes the computer program to perform the data forwarding method according to claim 1.

5. The first master base station according to claim 4, wherein each of the data forwarding addresses corresponding to the first identity identifications and the second identity identifications is a PDU-session-level data forwarding address for a preset PDU session.

6. The first master base station according to claim 4, wherein the processor is further configured to:

receive, through the transceiver, data directly forwarded by the second master base station and/or a second slave base station, after the handover request response message carrying the first preset information is sent to the second master base station.

7. A data forwarding method, applied to a second master base station and comprising:

receiving a handover request response message carrying first preset information sent by a first master base station, wherein the first preset information comprises: first identity identifications of all flows configured for the first master base station and data forwarding addresses corresponding to the first identity identifications, and second identity identifications of all flows configured for a first slave base station which is added and data forwarding addresses corresponding to the second identity identifications; and performing a data forwarding, according to the first identity identifications, the data forwarding addresses corresponding to the first identity identifications, the second identity identifications and the data forwarding addresses corresponding to the second identity identifications.

8. The data forwarding method according to claim 7, wherein the performing the data forwarding according to the first identity identifications, the data forwarding addresses corresponding to the first identity identifications, the second identity identifications and the data forwarding addresses corresponding to the second identity identifications comprises:

acquiring the first identity identification which is matched with an identity identification of a flow of which a service data adaptation protocol (SDAP) layer is at the second master base station;

forwarding the flow corresponding to the acquired first identity identification according to the data forwarding address corresponding to the acquired first identity identification; and/or acquiring the second identity identification which is matched with an identity identification of a flow of which a service data adaptation protocol (SDAP) layer is at the second master base station;

forwarding the flow corresponding to the acquired second identity identification according to the data forwarding address corresponding to the acquired second identity identification.

9. The data forwarding method according to claim 7, wherein the performing the data forwarding according to the first identity identifications, the data forwarding addresses corresponding to the first identity identifications, the second identity identifications and the data forwarding addresses corresponding to the second identity identifications comprises:

forwarding data to the first master base station and/or the first slave base station according to the first identity identifications, the data forwarding addresses corresponding to the first identity identifications, the second identity identifications and the data forwarding addresses corresponding to the second identity identifications.

10. The data forwarding method according to claim 7, wherein prior to the performing the data forwarding according to the first identity identifications, the data forwarding addresses corresponding to the first identity identifications, the second identity identifications and the data forwarding addresses corresponding to the second identity identifications, the method further comprises:

sending a slave base station release request carrying second preset information to a second slave base station, according to the first identity identifications, the data forwarding addresses corresponding to the first identity identifications, the second identity identifications and the data forwarding addresses corresponding to the second identity identifications;

wherein the second preset information comprises: at least one of the first identity identifications and/or the second identity identifications of the flows of which an SDAP layer is at the second slave base station, and the data forwarding address corresponding to the at least one of the first identity identifications and/or the second identity identifications;

each of the data forwarding addresses corresponding to the first identity identifications is a first tunnel address, and the first tunnel address is configured to forward data to the first master base station; and each of the data forwarding addresses corresponding to the second identity identifications is a second tunnel address, and the second tunnel address is configured to forward data to the first slave base station.

11. The data forwarding method according to claim 10, wherein the sending the slave base station release request carrying the second preset information to the second slave base station according to the first identity identifications, the data forwarding addresses corresponding to the first identity identifications, the second identity identifications and the data forwarding addresses corresponding to the second identity identifications comprises:

acquiring the identity identification of the flow, corresponding to the first identity identification and/or the second identity identification, of which the SDAP layer is at the second slave base station, and the data forwarding address corresponding to the identity identification;

sending the slave base station release request carrying the second preset information to the second slave base station, according to the identity identification and the data forwarding address corresponding to the identity identification.

12. A second master base station, comprising a memory, a processor, a transceiver and a computer program stored in the memory and executable by the processor, wherein the processor executes the computer program to perform the data forwarding method according to claim 7.

13. The second master base station according to claim 12, wherein the processor is further configured to:

acquire the first identity identification which is matched with an identity identification of a flow of which a service data adaptation protocol (SDAP) layer is at the second master base station;

forward the flow corresponding to the acquired first identity identification according to the data forwarding address corresponding to the acquired first identity identification; and/or acquire the second identity identification which is matched with an identity identification of a flow of which a service data adaptation protocol (SDAP) layer is at the second master base station;

forward the flow corresponding to the acquired second identity identification according to the data forwarding address corresponding to the acquired second identity identification.

14. The second master base station according to claim 12, wherein the processor is further configured to:

forward, through the transceiver, data to the first master base station and/or the first slave base station according to the first identity identifications, the data forwarding addresses corresponding to the first identity identifications, the second identity identifications and the data forwarding addresses corresponding to the second identity identifications.

15. The second master base station according to claim 12, wherein the processor is further configured to: prior to performing the data forwarding according to the first identity identifications, the data forwarding addresses corresponding to the first identity identifications, the second identity identifications and the data forwarding addresses corresponding to the second identity identifications, send, through the transceiver, a slave base station release request carrying second preset information to a second slave base station, according to the first identity identifications, the data forwarding addresses corresponding to the first identity identifications, the second identity identifications and the data forwarding addresses corresponding to the second identity identifications;

wherein the second preset information comprises: at least one of the first identity identifications and/or the second identity identifications of the flows of which an SDAP layer is at the second slave base station, and the data forwarding address corresponding to the at least one of the first identity identifications and/or the second identity identifications;

each of the data forwarding addresses corresponding to the first identity identifications is a first tunnel address, and the first tunnel address is configured to forward data to the first master base station; and each of the data forwarding addresses corresponding to the second identity identifications is a second tunnel address, and the second tunnel address is configured to forward data to the first slave base station.

16. The second master base station according to claim 15, wherein the processor is further configured to:

acquire the identity identification of the flow, corresponding to the first identity identification and/or the second identity identification, of which the SDAP layer is at the second slave base station, and the data forwarding address corresponding to the identity identification;

send, through the transceiver, the slave base station release request carrying the second preset information to the second slave base station, according to the identity identification and the data forwarding address corresponding to the identity identification.

17. A data forwarding method, applied to a second slave base station and comprising:

receiving a slave base station release request which is sent by a second master base station and carries second preset information, wherein the second preset information comprises:

an identity identification of a flow, corresponding to a first identity identification and/or a second identity identification, of which a service data adaptation protocol (SDAP) layer is at the second slave base station, and a data forwarding address corresponding to the identity identification;

performing a data forwarding according to the identity identification and the data forwarding address;

wherein the first identity identification is an identity identification of a flow configured for a first master base station, and the second identity identification is an identity identification of a flow configured for a first slave base station which is added;

the data forwarding address comprises a first tunnel address and/or a second tunnel address, the first tunnel address is configured to forward data to the first master base station, and the second tunnel address is configured to forward data to the first slave base station.

18. The data forwarding method according to claim 17, wherein the performing the data forwarding according to the identity identification and the data forwarding address comprises:

forwarding data to the first master base station and/or the first slave base station according to the identity identification and the data forwarding address.

19. A second slave base station, comprising a memory, a processor, a transceiver and a computer program stored in the memory and executable by the processor, wherein the processor executes the computer program to perform the data forwarding method according to claim 17.

20. The second slave base station according to claim 19, wherein the processor is further configured to:

forward, through the transceiver, data to the first master base station and/or the first slave base station according to the identity identification and the data forwarding address.

* * * * *